United States Patent [19]
Crawley et al.

[11] Patent Number: 5,995,503
[45] Date of Patent: Nov. 30, 1999

[54] METHOD AND APPARATUS FOR PROVIDING QUALITY OF SERVICE ROUTING IN A NETWORK

[75] Inventors: Eric S. Crawley, Maynard, Mass.; Zhaohui Zhang, Durham, N.H.; William M. Salkewicz, Chelmsford; Cheryl A. Sanchez, Westford, both of Mass.

[73] Assignee: Bay Networks, Inc., Santa Clara, Calif.

[21] Appl. No.: 08/661,312

[22] Filed: Jun. 12, 1996

[51] Int. Cl.⁶ .................................................. H04L 12/46
[52] U.S. Cl. ............................................. 370/351; 370/401
[58] Field of Search ...................................... 370/400, 401, 370/402, 256, 254, 255, 238, 351; 395/200.48, 200.5, 200.57, 200.68, 200.69, 200.82

[56] References Cited

U.S. PATENT DOCUMENTS

| | | | |
|---|---|---|---|
| 4,864,559 | 9/1989 | Perlman | 370/400 |
| 5,088,032 | 2/1992 | Bosack | 370/401 |
| 5,233,604 | 8/1993 | Ahmadi et al. | 370/468 |
| 5,367,517 | 11/1994 | Cidon et al. | 370/400 |
| 5,461,611 | 10/1995 | Drake, Jr. et al. | 370/54 |
| 5,471,467 | 11/1995 | Johann | 370/400 |
| 5,600,638 | 2/1997 | Bertin et al. | 370/400 |
| 5,649,108 | 7/1997 | Spiegel et al. | 370/400 |

OTHER PUBLICATIONS

Zhang et al. "RSVP: A New Resource Reservation Protocol" IEEE Network, pp. 8–13, Sep. 1993.

Moy, OSPF (Open Shortest Path First) Version 2, Network Working Group Request for Comments: 1583, Mar. 1994.

Moy, Multicast Extensions to OSPF, Network Working Group Request for Comments: 1584, Mar. 1994.

Coltun, The OSPF Opaque LSA Option, Internet Engineering Task Force (IETF), Internet–Draft, draft–ietf–opaque–01.txt, Feb. 1996.

Braden, et al, Resource Reservation Protocol (RSVP)–Version 1 Functional Specification, Internet Engineering Task Force (IETF), Internet–Draft, draft–ietf–rsvp–spec–12.ps, May 6, 1996.

Private Network–Network Interface Specification Version 1.0 (PNNI 1.0), The ATM Forum Technical Committee, af–pnni–0055.000, Mar. 1996.

*Primary Examiner*—Chau Nguyen
*Attorney, Agent, or Firm*—Blakely, Sokoloff, Taylor & Zafman

[57] ABSTRACT

A system for providing quality of service routing functions in a connectionless network having multiple nodes. The system generates a link resource advertisement for each node in the network. Each link resource advertisement includes information regarding link resources available on a particular node in the network. The system also generates resource reservation advertisements for each node in the network. Each resource reservation advertisement includes information regarding a particular node's current reservations for a data flow. Network paths are calculated in response to a quality of service request. The calculations are performed based on information contained in the link resource advertisements and resource reservation advertisements.

22 Claims, 17 Drawing Sheets

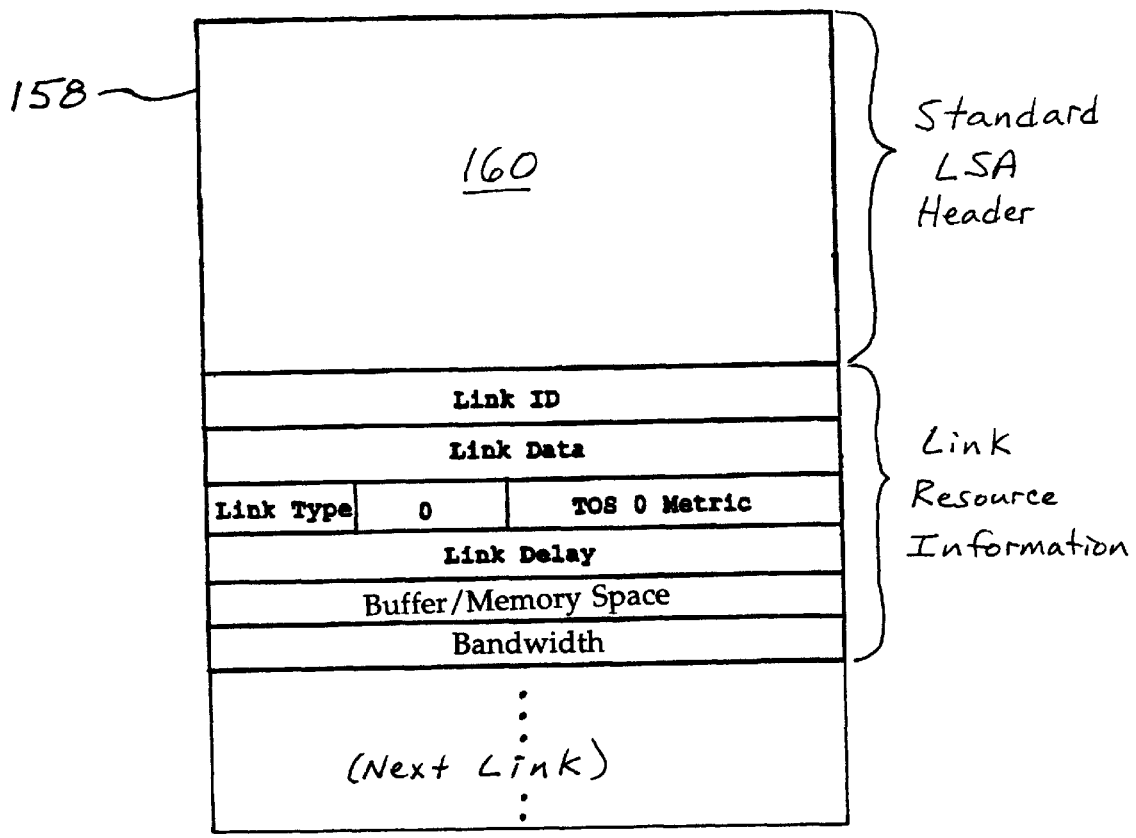

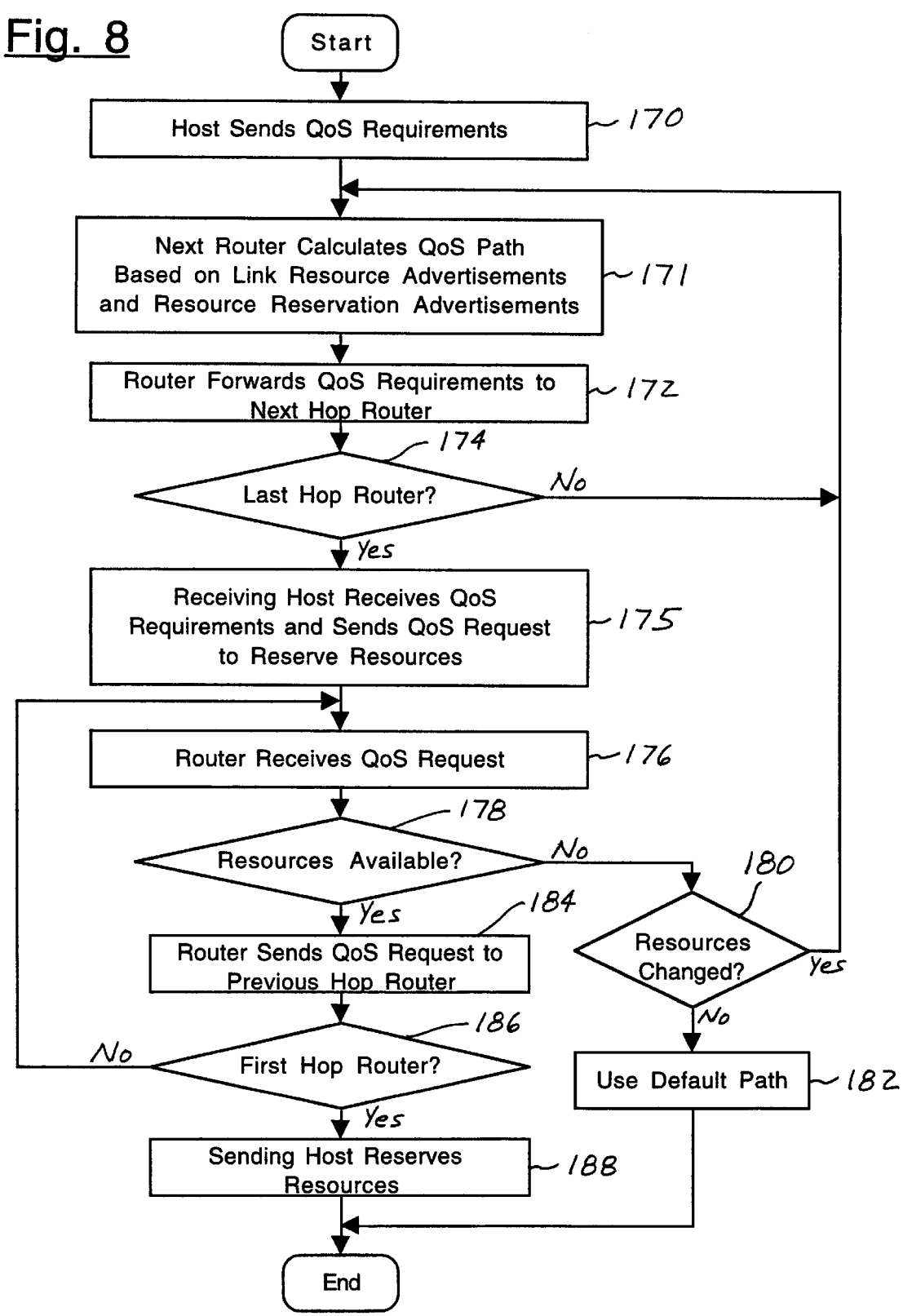

METHOD AND APPARATUS FOR PROVIDING QUALITY OF SERVICE ROUTING IN A NETWORK

BACKGROUND OF THE INVENTION

1. Field of the Invention

The present invention relates to a system for providing quality of service routing functions in a network environment.

2. Background

Various types of data may be transmitted between hosts coupled to a network. Certain types of data transmissions (or data flows) may require a specific Quality of Service (QoS) from the network. QoS may be specified in terms of minimum bandwidth requirements, transmission delay, or the amount of memory or buffer space required for the data flow. For example, a video conference or other real-time data may have a high QoS and require substantial bandwidth and minimum delay from the network. By specifying the QoS required for a particular data flow, the data source or destination can ascertain whether an acceptable path is available. Thus, QoS routing allows data flows to be routed around links without adequate resources.

Link-state routing protocols are used to advertise the existence of various connections (or links) in a network. By advertising the existence of network links to other nodes (or routers) in a network, each router learns the topology of the network.

An example of a link-state routing protocol is the Open Shortest Path First (OSPF) routing protocol. Each router running the OSPF protocol maintains an identical database describing the network topology. Using this topology database, each router is able to generate a routing table by constructing a shortest-path tree with the router at the root of the tree. OSPF is a dynamic routing protocol; i.e., OSPF detects changes in network topology and recalculates paths based on the new topology. Typically, all routers in an autonomous network run the OSPF protocol simultaneously.

OSPF allows multiple networks and routers to be grouped together. These groupings are commonly referred to as areas. The specific topology of a particular area is not broadcast to other areas. Instead, a summary of the area is transmitted to other areas, thereby reducing the amount of link-state information which must be transmitted through the network. Since a router may be connected to more than one area, each router that borders multiple areas maintains a separate topology database for each area. A separate copy of OSPF's basic routing algorithm is executed in each area. Additionally, routing within a particular area is determined only by the topology of the particular area. Each area may use a different authentication scheme, such that some areas use stricter authentication schemes than other areas.

OSPF provides link state advertisements (LSAs) for describing the local state of a router or network. Each LSA is flooded (or broadcast) throughout the area. The topology database is generated and maintained using the data contained in the LSAs.

MOSPF is a multicasting extension to OSPF. Multicasting is the distribution of datagrams from a source to multiple destinations. The multiple destinations may be members of a multicast group such that each member of a multicast group receives datagrams addressed to the group. By adding a new type of LSA, the group membership LSA, MOSPF is able to determine the location of all multicast group members in the network.

Another type of LSA which may be supported by OSPF is the Opaque LSA. The Opaque LSA provides a general mechanism to permit future extensions of the OSPF protocol.

OSPF and MOSPF are examples of protocols used with connectionless networks. Connectionless networks rely on addressing information within the transmitted data to properly route data through the network.

Various protocols and other mechanisms may be used to trigger or request a QoS route calculation. A specific QoS signaling protocol is the Resource Reservation Protocol (RSVP). RSVP may be used by a host to request a particular QoS from the network. Additionally, the RSVP protocol is used by routers to deliver QoS requests to all nodes along the path of the data flow. Other protocols or resource reservation mechanisms may be used in connection with the present invention to request a specific QoS for a data flow.

As mentioned above, QoS routing may request a particular bandwidth or other network resource for a specific data flow. However, many connectionless networks fail to provide a QoS routing function. For example, neither OSPF nor MOSPF provide a mechanism for a host to request a specific QoS from the network. Therefore, it is desirable to provide a QoS routing capability for use in connectionless networks.

SUMMARY OF THE INVENTION

The present invention provides a system for providing quality of service (QoS) routing functions in a connectionless network. The invention permits a host coupled to a connectionless network to request a particular QoS routing for a specific data flow. According to the present invention, routers in the network attempt to identify and establish a path for the data flow having the requested QoS.

An embodiment of the present invention provides a system that generates a link resource advertisement for each node in the network. Each link resource advertisement includes information regarding link resources available on a particular node in the network. The system also generates a resource reservation advertisement for each reservation on each node in the network. Each resource reservation advertisement includes information regarding a particular node's reservations. Network paths are then calculated in response to a QoS request. The network path calculations are based on information contained in the link resource advertisements and the resource reservation advertisements.

In various embodiments of the invention, the link resource advertisements may contain information regarding a delay factor associated with each link, the largest amount of available resources for each link, or the available bandwidth on each link.

An embodiment of the invention includes a mechanism for pinning an established path such that the path does not change in response to changes in available link resources or network topology not on the established path.

A further aspect of the invention establishes a path between a source and a destination by considering only links having sufficient available or reserved resources.

A specific embodiment of the invention is implemented using the open shortest path first (OSPF) routing protocol.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those skilled in the art will appreciate that the invention may be practiced without these specific details. In other instances, well known methods, procedures, components, and circuits have not been described in detail so as not to obscure the invention.

The present invention is related to a system for providing Quality of Service (QoS) routing functions in a network environment. The invention may be used to provide QoS extensions to various protocols for connectionless networks. Using a QoS signaling protocol, a host coupled to a connectionless network may request a specific QoS from the network. If sufficient resources are available to satisfy the QoS request, then the QoS path is established, thereby enabling QoS routing through the connectionless network.

Figure 1:
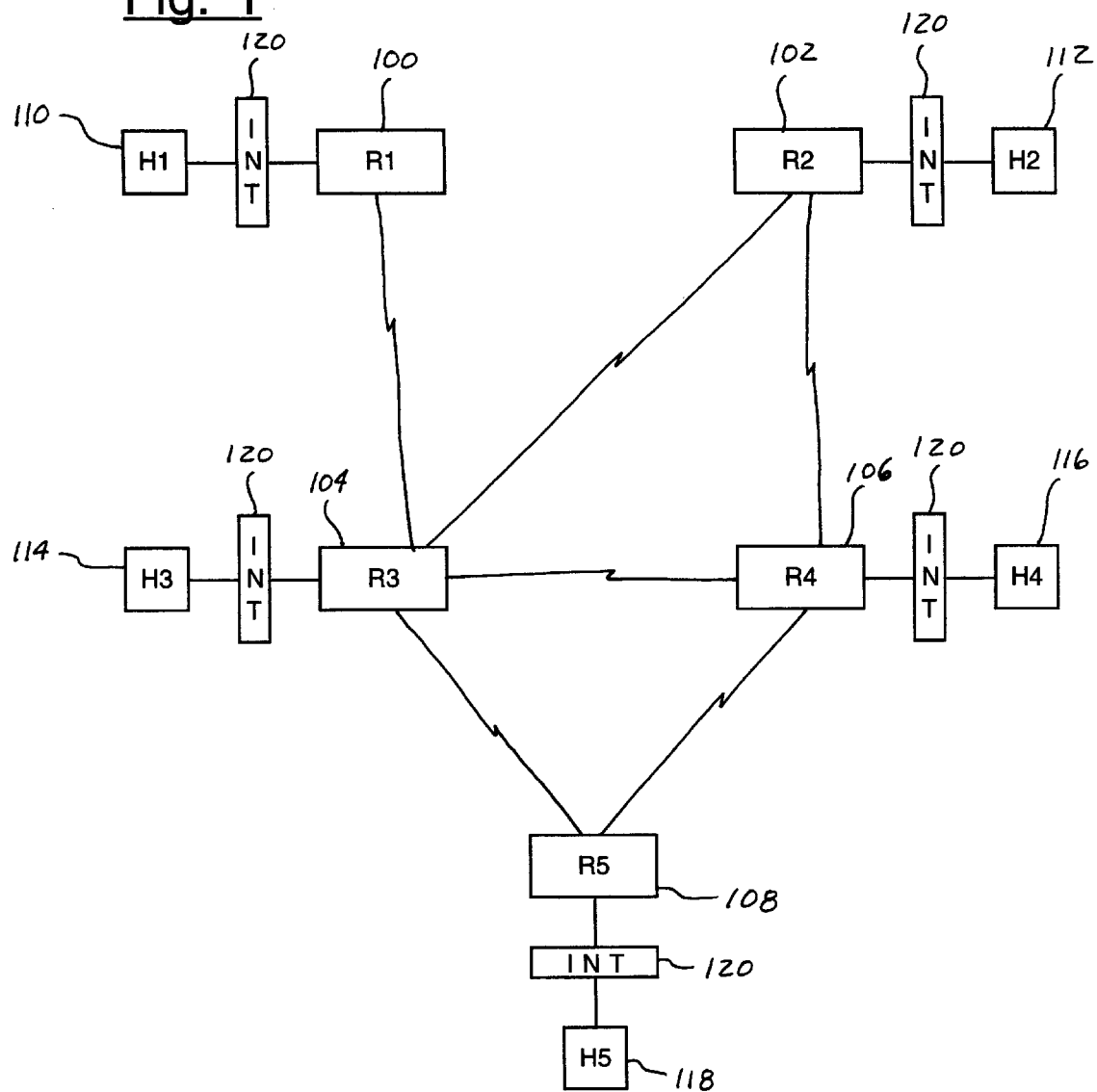
FIG. 1 illustrates an exemplary network having multiple hosts and multiple routers.

FIG. 1 illustrates an exemplary network having multiple hosts and multiple routers connected as shown. The network shown in FIG. 1 represents one possible network configuration and will be used to describe the operation of the invention. Specifically, five routers 100, 102, 104, 106, and 108 (also referred to as R1, R2, R3, R4, and R5, respectively) are coupled to one another as shown. FIG. 1 also illustrates five host devices 110, 112, 114, 116, and 118 (also referred to as H1, H2, H3, H4, and H5, respectively). Each host is coupled to a particular router using an interface 120. Interface 120 may be any type of interface circuit, including a network, capable of coupling one or more hosts to a router. Alternatively, interface 120 may be omitted, and the host (or hosts) coupled directly to the router. To simplify the illustration, only one host device is shown coupled to each router. Those skilled in the art will appreciate that multiple hosts may be coupled to a single router and a single host may be coupled to multiple routers.

QoS routing allows a particular host to request a specific QoS for a data flow. For example, host 110 may desire a path to host 116 having a specific bandwidth. Host 110 generates a request to establish a QoS routing to host 116. Using the mechanisms described below, a determination is made regarding whether a path exists with the requested resources. If an acceptable path is identified, the path is established and the data flow from host 110 to host 116 is initiated. Otherwise, the host is not given the requested QoS, but instead receives a standard path generated by the routing protocol.

Figure 2:
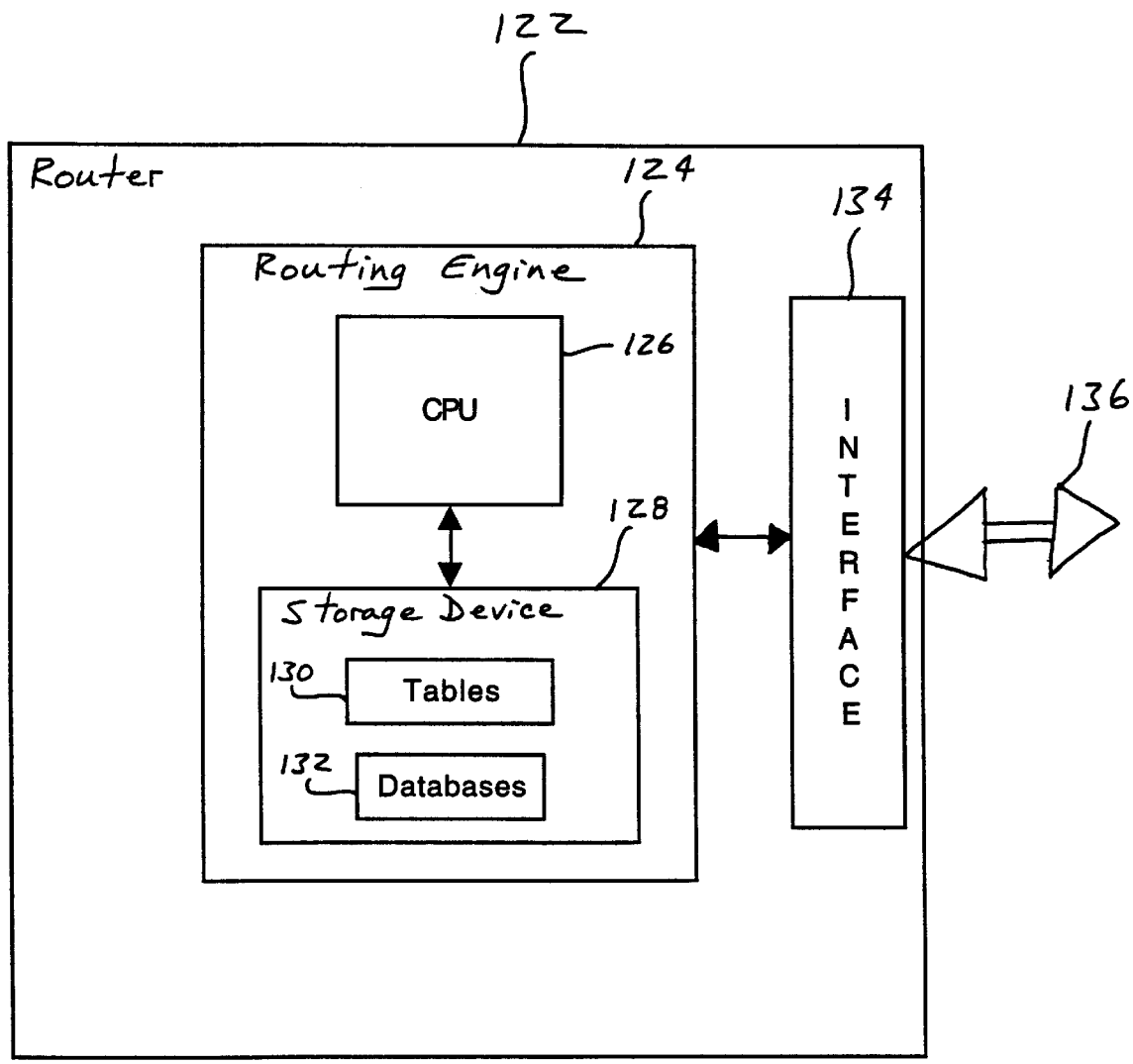
FIG. 2 is a block diagram of a typical router capable of implementing the teachings of the invention.

Referring to FIG. 2, a block diagram of a typical router 122 is illustrated. Router 122 is capable of incorporating the teachings of the present invention and includes a routing engine 124 having a CPU 126 and a storage device 128. Storage device 128 may be a memory, disk drive, or other mechanism capable of storing data. Routing engine 124 includes various routing tables 130 and databases 132 contained within storage device 128. Tables 130 and databases 132 maintain information necessary for router 122 to properly forward data. Databases 132 may include a Link State Database and a Forwarding Database. Routing engine 124 is capable of calculating paths through a network based on information contained in routing tables 130 and databases 132. An interface 134 is coupled to routing engine 124 and provides a physical connection to one or more network links 136. A single interface 134 is illustrated for clarity. However, a router may have multiple interfaces 134 coupled to multiple network links 136. Those skilled in the art will appreciate that various types of routers may be used with the invention described herein.

QoS routing is provided in a connectionless network by advertising various information about the network nodes (e.g., routers) and network links (or connections) in the network. Specifically, the invention provides a mechanism for advertising available resources (e.g., available bandwidth) for a particular router to other routers in the network. These advertisements inform other routers of the resources available on each link in the network. Throughout this specification, any references to "network" shall be understood to include "areas" of a routing domain (e.g., an OSPF Routing Domain). Thus, the advertising of available resources may be conducted throughout an entire network or within a particular area of the network. As discussed in the background, network areas represent separate networks which are grouped together to form a larger network.

In existing protocols for connectionless networks, such as Open Shortest Path First (OSPF), QoS routing is not provided. Adding QoS routing capabilities to the OSPF protocol allows the routers to find a path (also referred to as "route") around links without adequate resources to provide a path with the requested QoS. Although this alternate path may not be the shortest path to the destination, the path does provide the requested resources such that the data flow can be supported.

Figure 3:
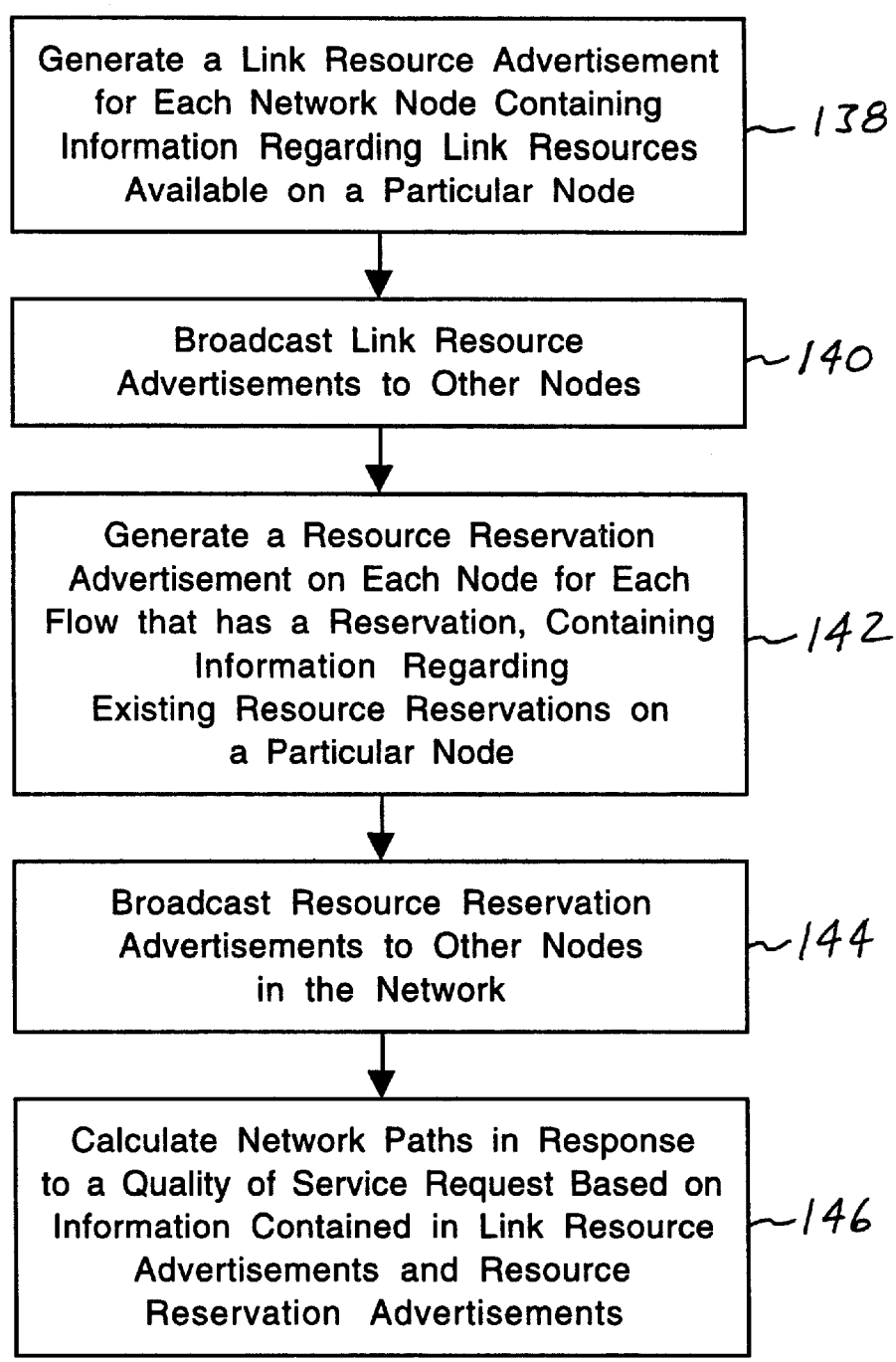
FIG. 3 is a flow diagram illustrating a procedure for generating and broadcasting information regarding available network resources and existing resource reservations.

Referring to FIG. 3, a flow diagram illustrates a procedure for generating and broadcasting information regarding available network resources as well as existing resource reservations. At step 138, a Link Resource Advertisement is generated for each node in the network. The Link Resource Advertisement contains information regarding link resources available for a particular node in the network. The available resources advertised may include the available bandwidth on each link connected to the node, a delay factor associated with each link, or available buffer or memory resources. At step 140, each Link Resource Advertisement is broadcast to other nodes in the network or area. By broadcasting Link Resource Advertisements throughout the network or area, each node in the network learns of the available resources on the various links. Additional details regarding generating and broadcasting Link Resource Advertisements are provided below.

At step 142 in FIG. 3, a Resource Reservation Advertisement is generated on each node for each flow that has a reservation. The Resource Reservation Advertisement contains information regarding a node's existing reservations for a particular data flow; i.e., a particular source-destination data flow. At step 144, each Resource Reservation Advertisement is broadcast to other nodes in the network. By broadcasting Resource Reservation Advertisements, each node in the network learns of the resources already reserved by existing data flows. These existing reservations are considered when calculating or recalculating paths. Additional details regarding generating and broadcasting Resource Reservation Advertisements are provided below.

Since each node in the network learns of the available resources and existing resource reservations, QoS routing is possible. At step 146 in FIG. 3, network paths are calculated in response to a QoS request. The path calculations are based on information received in the Link Resource Advertisements and Resource Reservation Advertisements. When a specific QoS routing request is received, the network resource information is analyzed to determine whether the requested QoS is available. If available, resources for the requested QoS path are reserved for the data flow. Otherwise, the requested QoS route cannot be established and, instead, a standard path is established to the destination.

The procedures used to generate resource advertisements and establish paths through the network may be executed on a router or other network device. Additionally, the procedures may be executed on multiple routers simultaneously.

Figure 4:
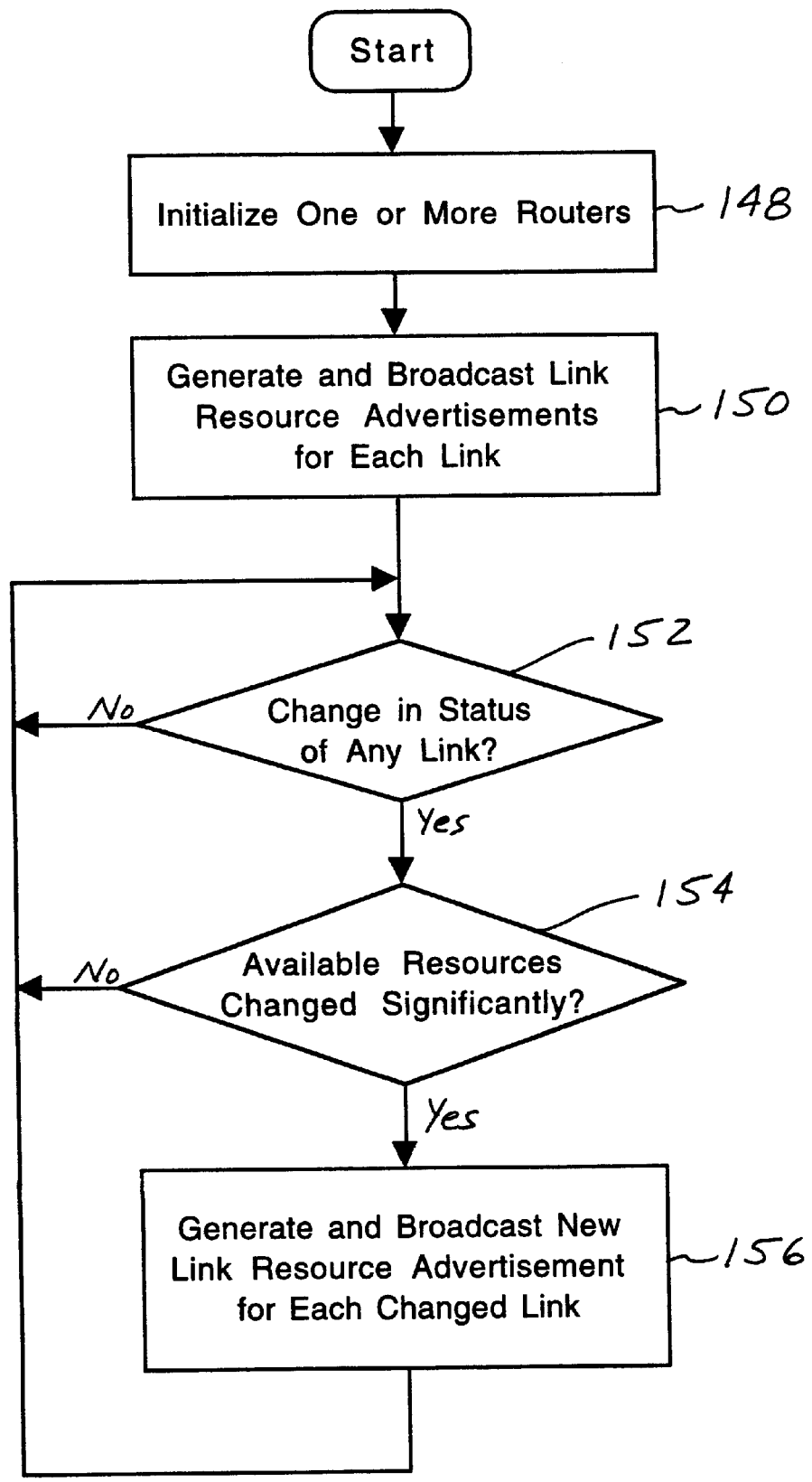
FIG. 4 is a flow diagram showing a procedure for generating and broadcasting Link Resource Advertisements.

Referring to FIG. 4, a flow diagram illustrates a procedure for generating and broadcasting Link Resource Advertisements. At step 148, one or more routers are initialized. After initialization, Link Resource Advertisements are generated and broadcast at step 150. If a single router is initialized (i.e., reset, or added to the network), then Link Resource Advertisements are generated for the router. If the entire network is initialized or significantly altered, then Link Resource Advertisements may be generated for each initialized router in the network.

At step 152 of FIG. 4, the procedure determines whether the status of any link in the network has changed. If no change is identified, then the procedure returns to step 152, thereby continuously testing for changes in link status. If the status of any link has changed, then the procedure continues to step 154 to determine whether the available resources for the link (or links) has changed significantly. By requiring a significant change in available resources, the system avoids generating and broadcasting Link Resource Advertisements when minor or insignificant resource changes have occurred. If the available resources have not changed significantly at step 154, the procedure returns to step 152 and awaits the next change in link status. Otherwise, the procedure continues to step 156 where new Link Resource Advertisements are generated and broadcast for each changed link. The procedure then returns to step 152 to identify the next change in link status. In another embodiment of the invention, step 154 is eliminated from the procedure shown in FIG. 4; i.e., any change in the status of a link will cause the generation and broadcast of Link Resource Advertisements.

As stated above, the QoS routing procedures provided by the present invention may be used with link state routing protocols. A specific example of the QoS routing procedures will be described with reference to the Open Shortest Path First (OSPF) routing protocol. As discussed above, OSPF uses Link State Advertisements (LSAs) to broadcast information regarding various routers and links in the network.

Figure 5:
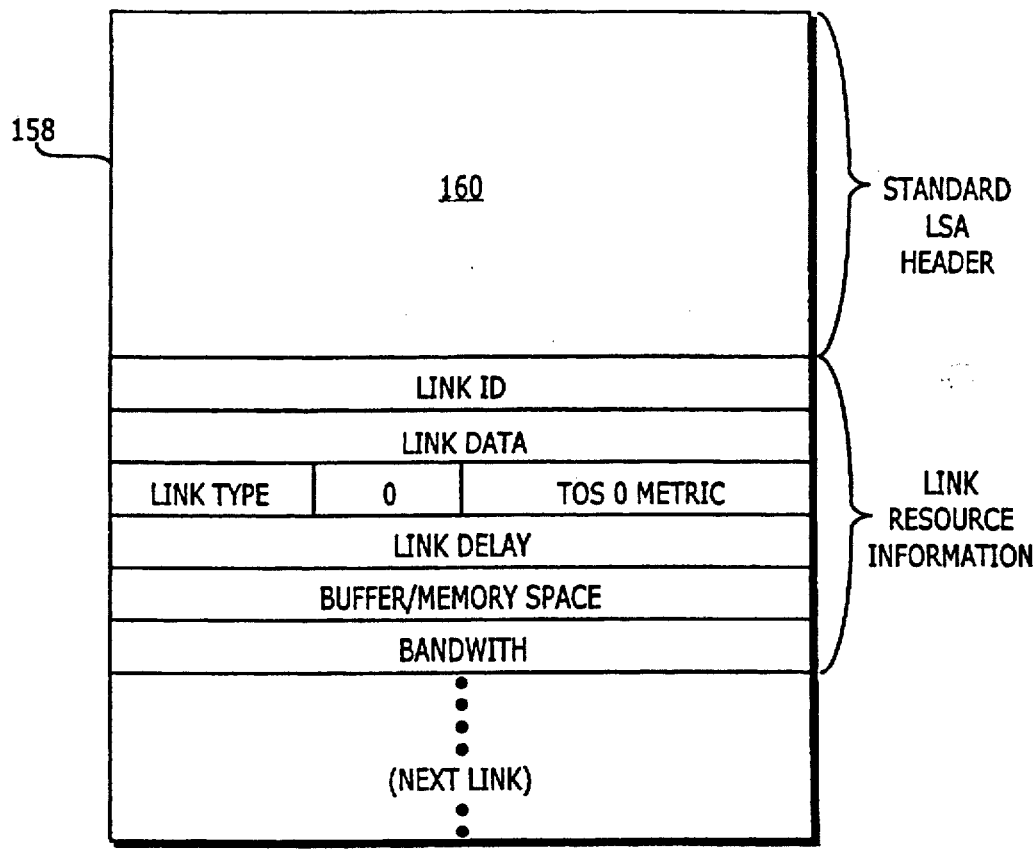
FIG. 5 illustrates an example of a Link State Advertisement including link resource information.
Figure 6:
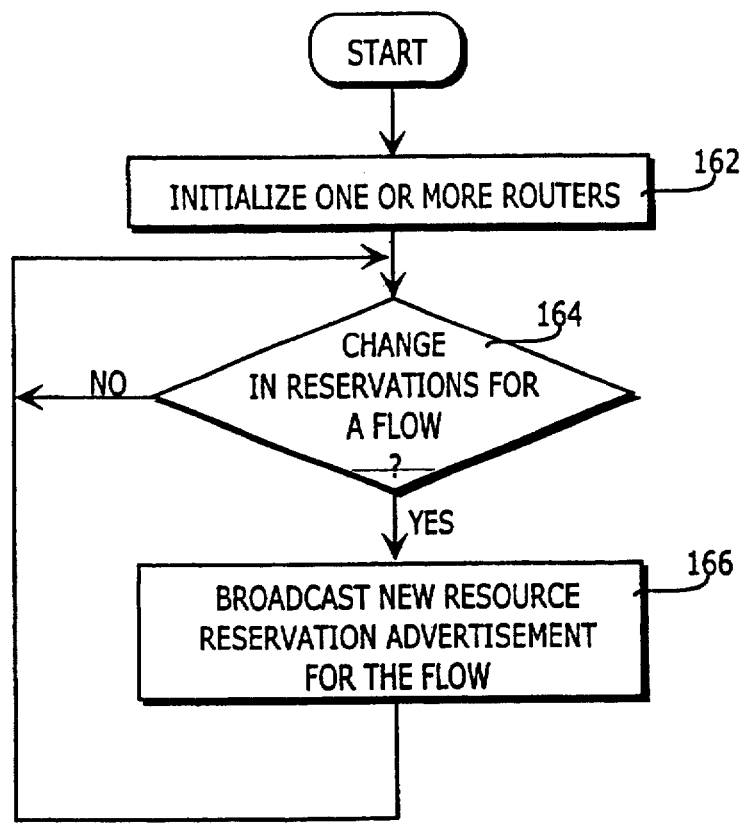
Figure 7:
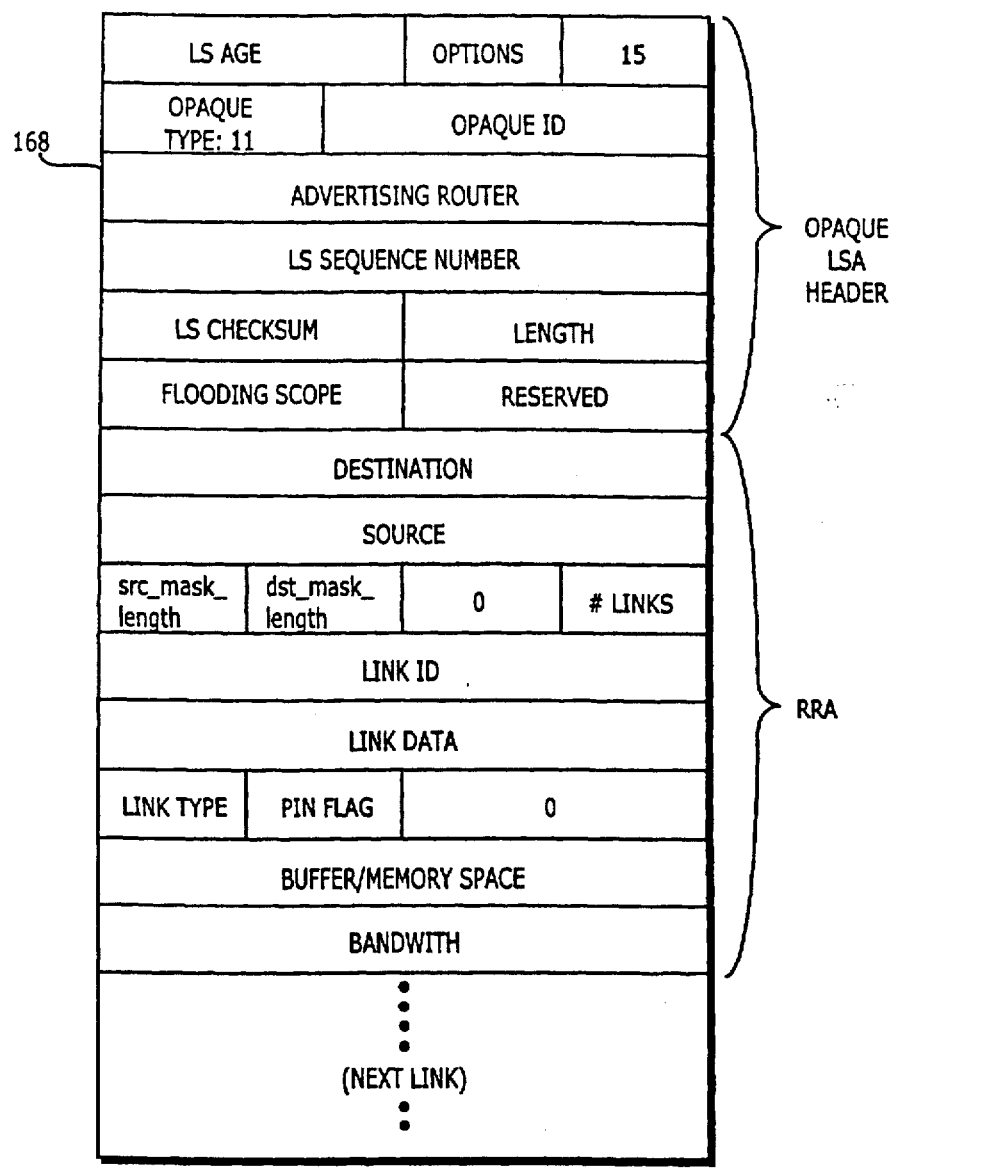

FIG. 5 illustrates an exemplary format for an LSA 158 including link resource information (referred to as an RES-LSA). RES-LSA 158 is similar to a typical Router-LSA used in OSPF routing, but includes additional information regarding available link resources. Each RES-LSA 158 includes the standard LSA header information 160 and link resource information for the particular link being advertised. For each area a router is coupled to, a separate RES-LSA 158 is generated and broadcast throughout the area. As shown in FIG. 5, the link resource information is repeated for each link coupled to the router in that area.

The link resource fields contained in each RES-LSA 158 includes Link ID, Link Data, Link Type, TOS 0 Metric, Link Delay, Buffer/Memory Space and Bandwidth. Link ID is a link identifier and Link Delay is a delay factor for the link, typically represented in milliseconds. Link Type indicates the type of link described and the TOS 0 Metric field is the cost associated with the particular link. Buffer/Memory Space provides information regarding the router's reservable buffer or memory space. Bandwidth refers to the link's reservable bandwidth.

Figure 6:
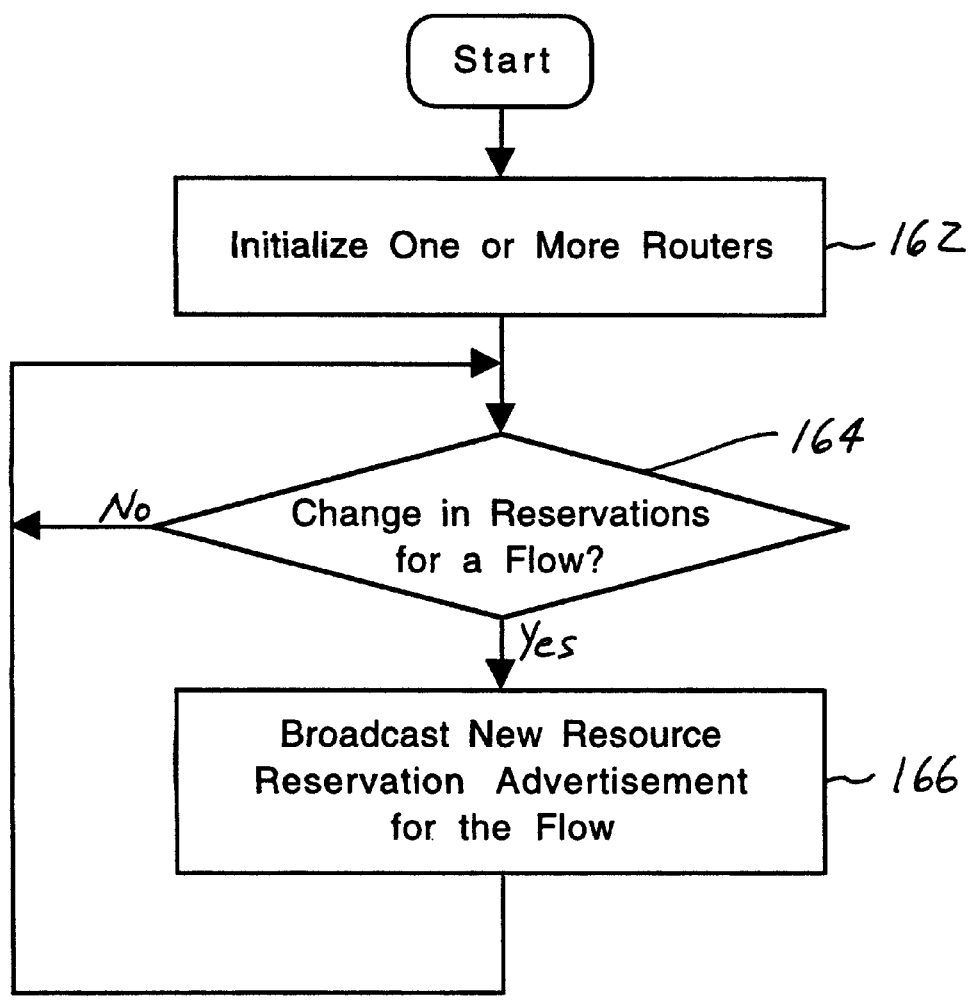
FIG. 6 is a flow diagram illustrating a procedure for generating and broadcasting Resource Reservation Advertisements.

Referring to FIG. 6, a flow diagram illustrates a procedure for generating and broadcasting Resource Reservation Advertisements. As discussed above, a Resource Reservation Advertisement contains information regarding a router's reservations for a particular data flow such that other routers are aware of the resources and path used by the data flow.

At step 162 of FIG. 6, one or more routers are initialized. After initialization, step 164 tests for changes in reservations for a data flow. If no changes have occurred in the reservations for the data flow, then the procedure returns to step 164 and continuously tests for changes in reservations for the data flow. If changes in reservations for a data flow are indicated at step 164, then the procedure continues to step 166 where a new resource reservation advertisement for the data flow is generated and broadcast to other routers. After broadcasting the new resource reservation advertisement, the procedure returns to step 164 to identify the next change in reservations.

Figure 7:
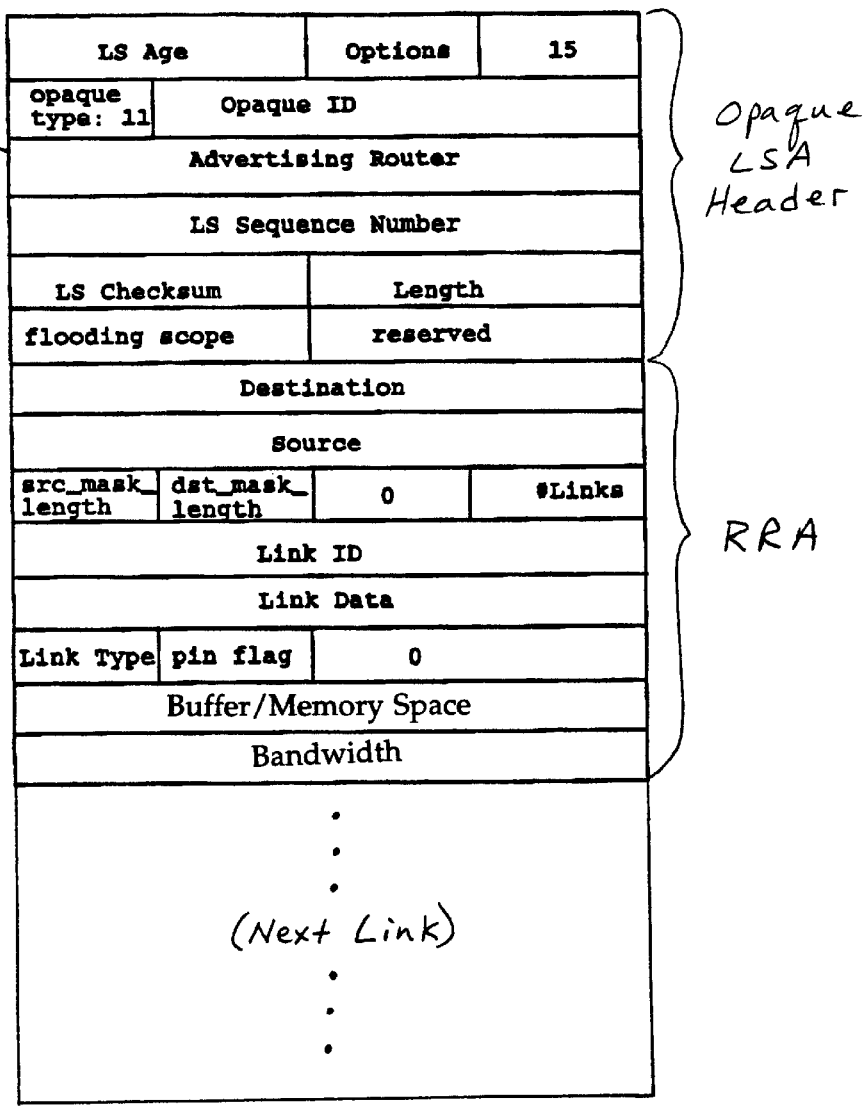
FIG. 7 illustrates an example format for a Resource Reservation Advertisement.

As discussed above, a specific example of the QoS routing procedure is described with reference to the OSPF routing protocol. FIG. 7 illustrates an exemplary format for a Resource Reservation Advertisement 168 (referred to as an RRA). The top portion of FIG. 7 illustrates the data contained in a typical Opaque LSA Header. The bottom portion of FIG. 7 illustrates the actual data relating to resource reservations. The Destination and Source parameters identify the particular source-destination data flow for which resources are reserved. The src_mask_length and dst_mask_length correspond to the network mask lengths for the source and destination, respectively. # Links is the number of links in the LSA. The Link ID, Link Data, and Link Type fields are the same as those used in a Router-LSA. The pin flag field is used for partial route pinning, discussed below. The Buffer/Memory Space field refers to the buffer or memory space already reserved. Bandwidth refers to the link's reserved bandwidth.

As shown in FIG. 7, the Link ID, Link Data, Link Type, pin flag, Buffer/Memory Space, and Bandwidth fields are repeated for each link that has a reservation for the flow.

In larger networks, RRAs may not scale well due to the large amount of reservation data which must be generated, transmitted, stored, and processed by the routers. Certain changes to the routing procedures used in the network may reduce the amount of data generated and transmitted across the network. A particular solution utilizes an approach referred to as "explicit routing" in which the first hop router calculates the entire path through the network and instructs each downstream router how to forward the data. Additional details regarding explicit routing are provided below.

As discussed above, various protocols and other mechanisms may be used to trigger or request a QoS route calculation. A particular embodiment of the invention uses the Resource Reservation Protocol (RSVP). However, other resource reservation protocols and mechanisms may be used with the present invention to request a specific QoS for a data flow.

Figure 8:
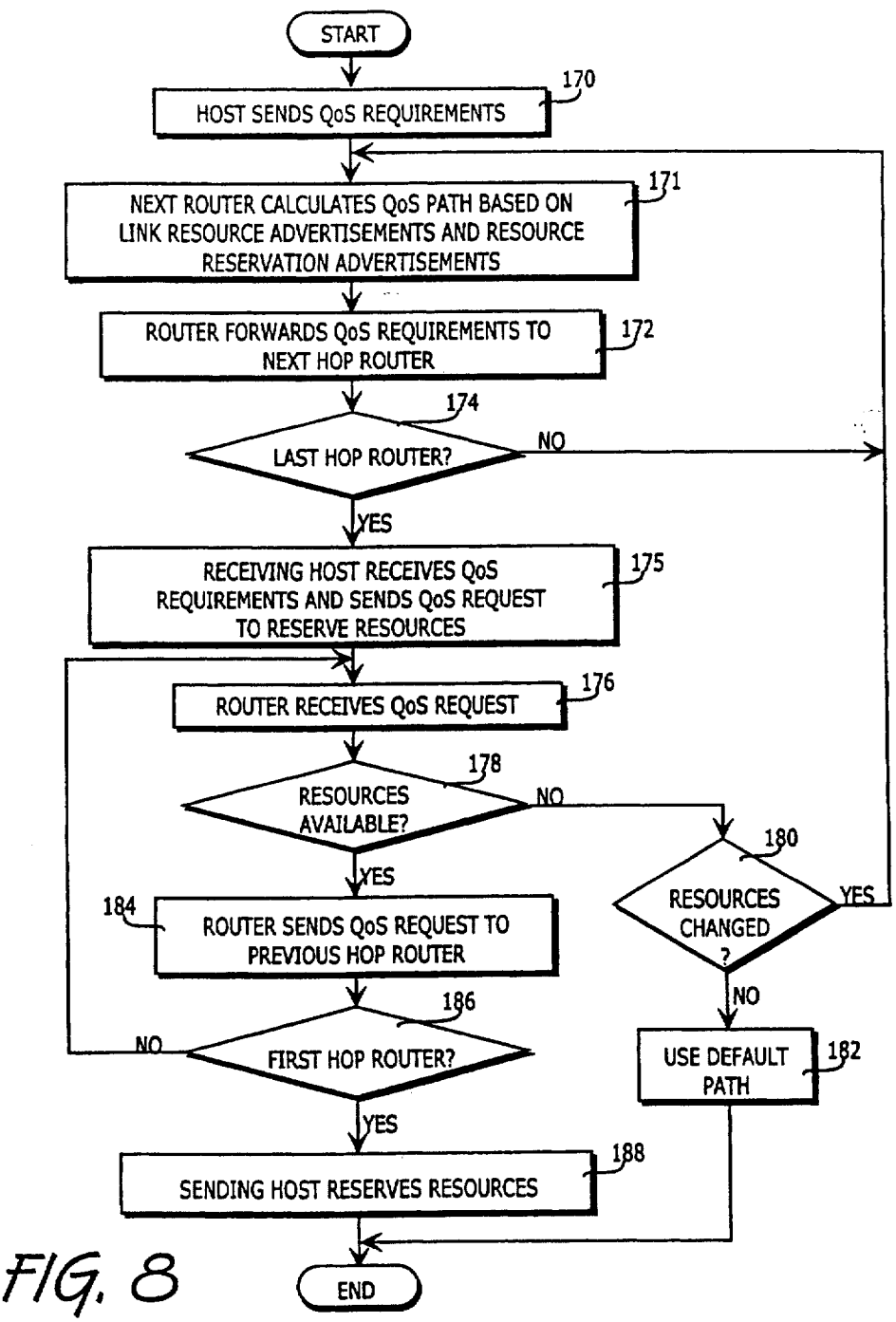
FIG. 8 is a flow diagram showing a procedure for establishing a QoS path in response to a QoS routing request.
Figure 9:
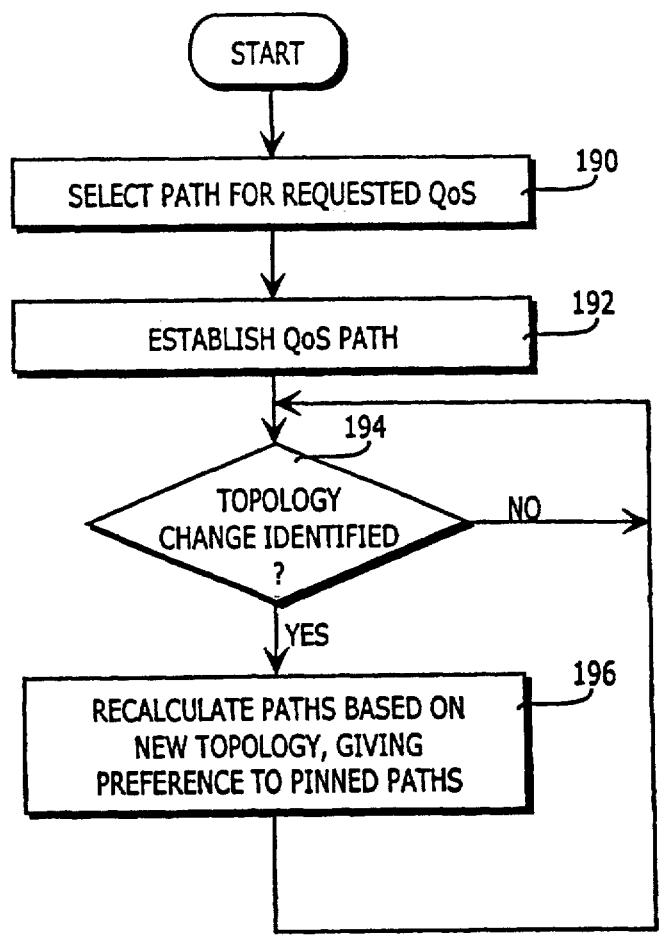
Figure 10:
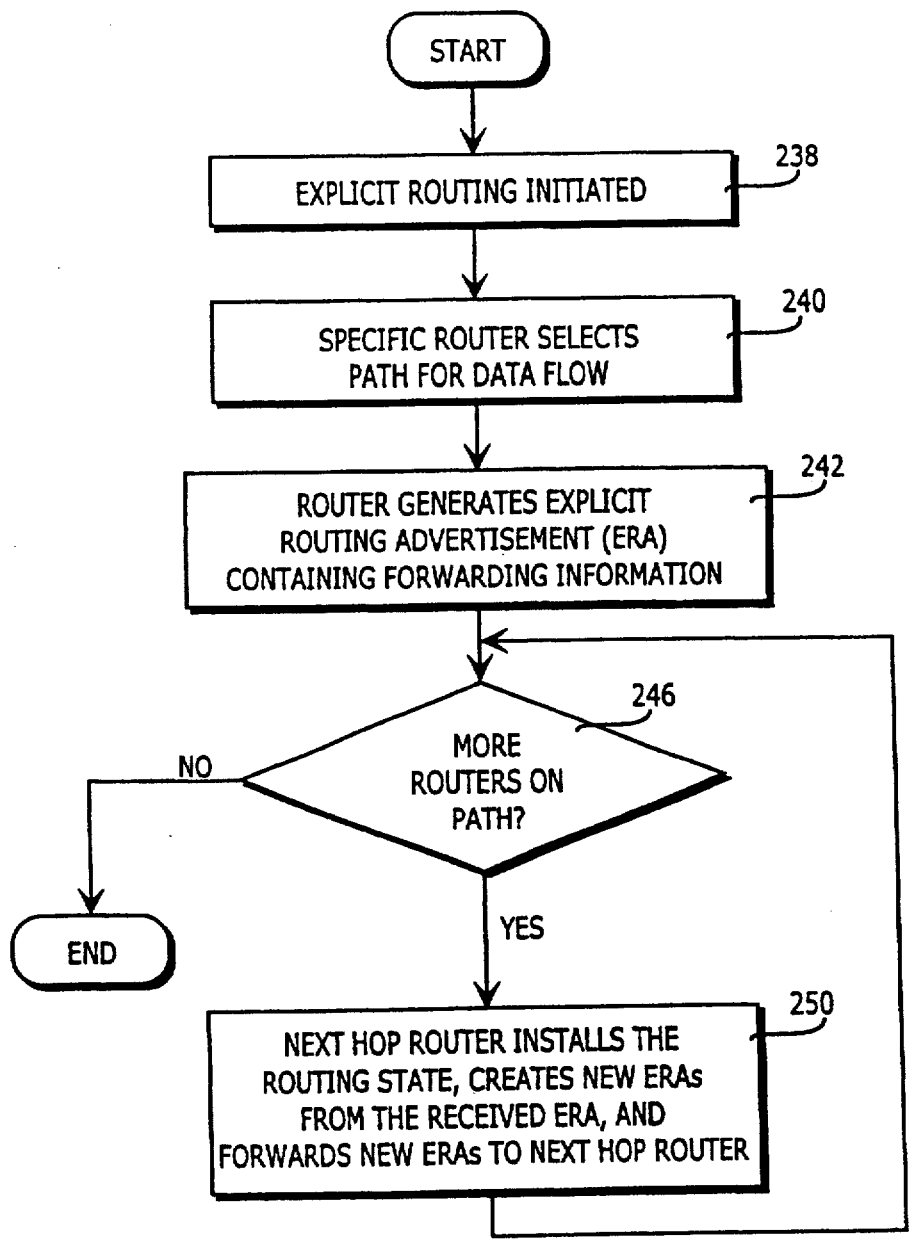
Figure 11:
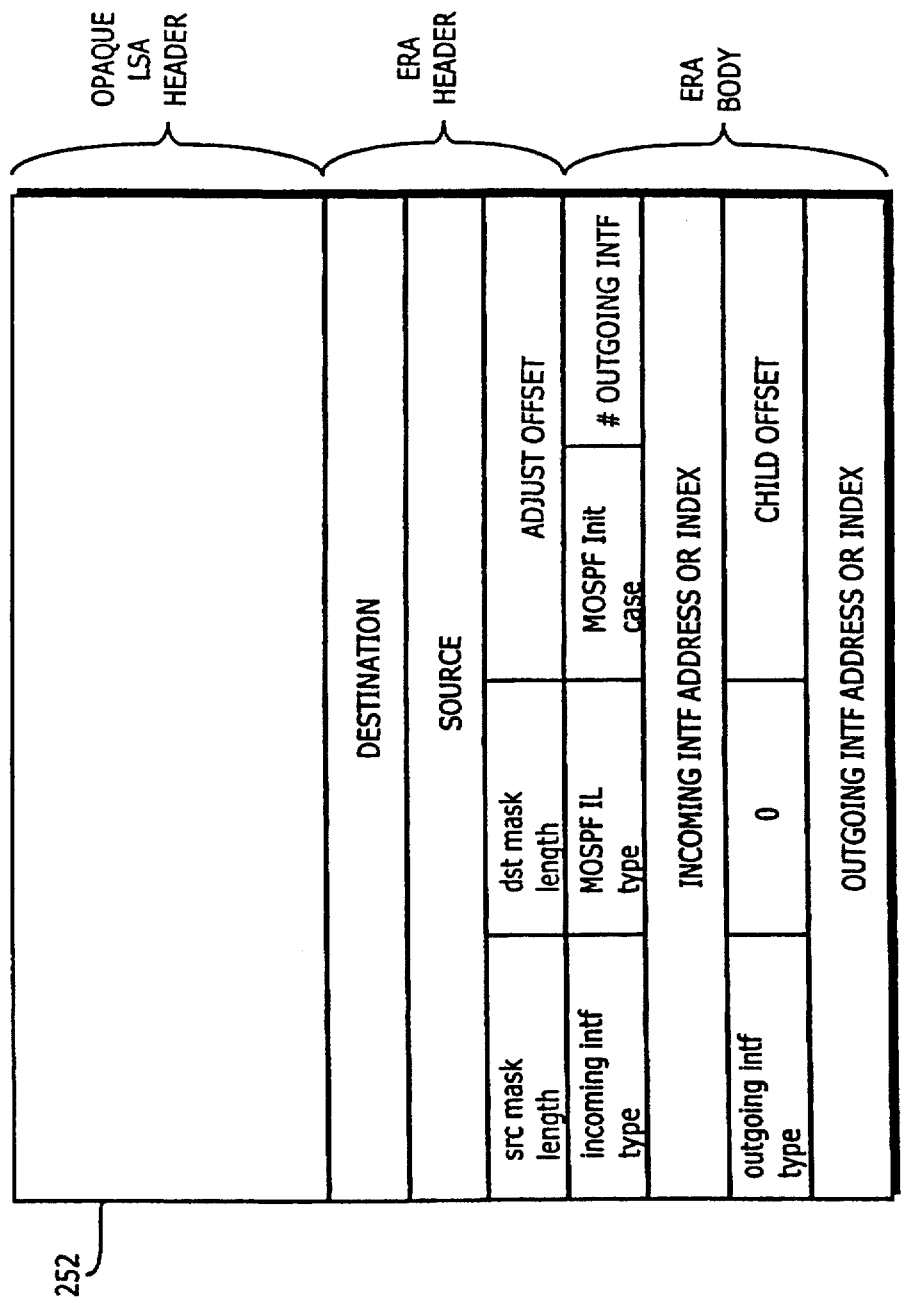
Figure 12:
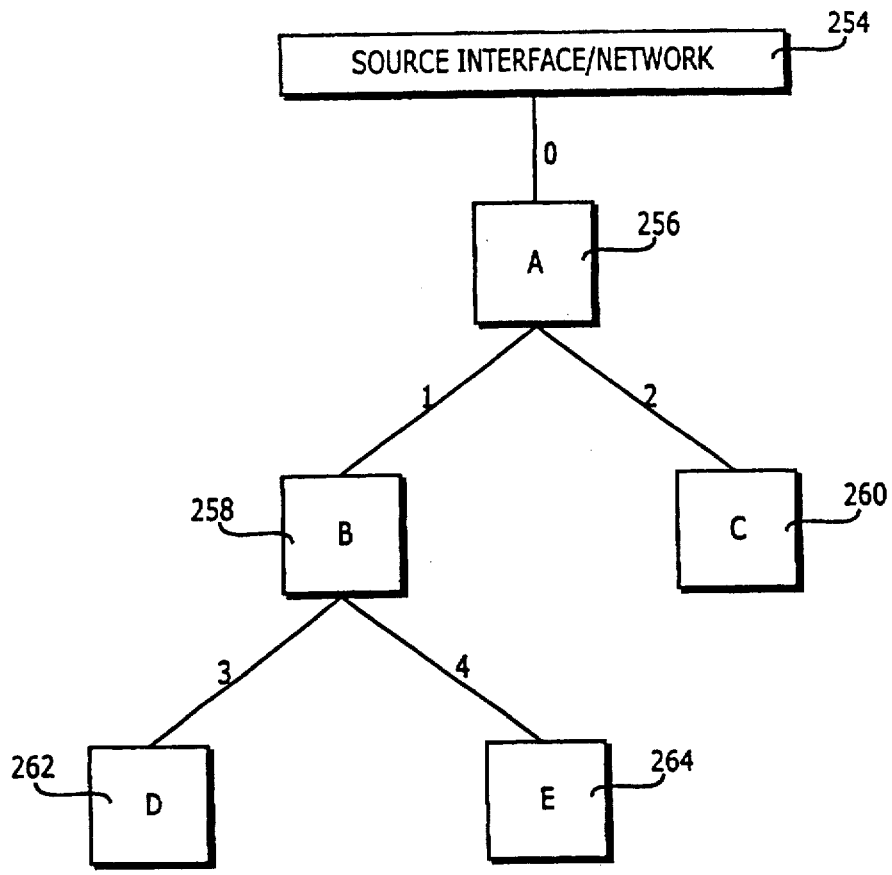
Figure 13:
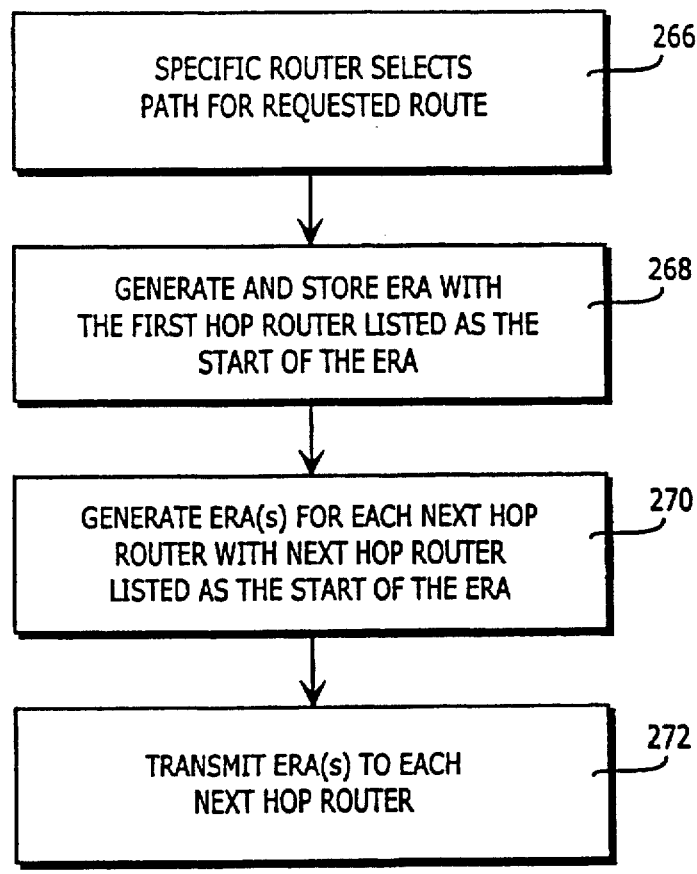
Figure 14:
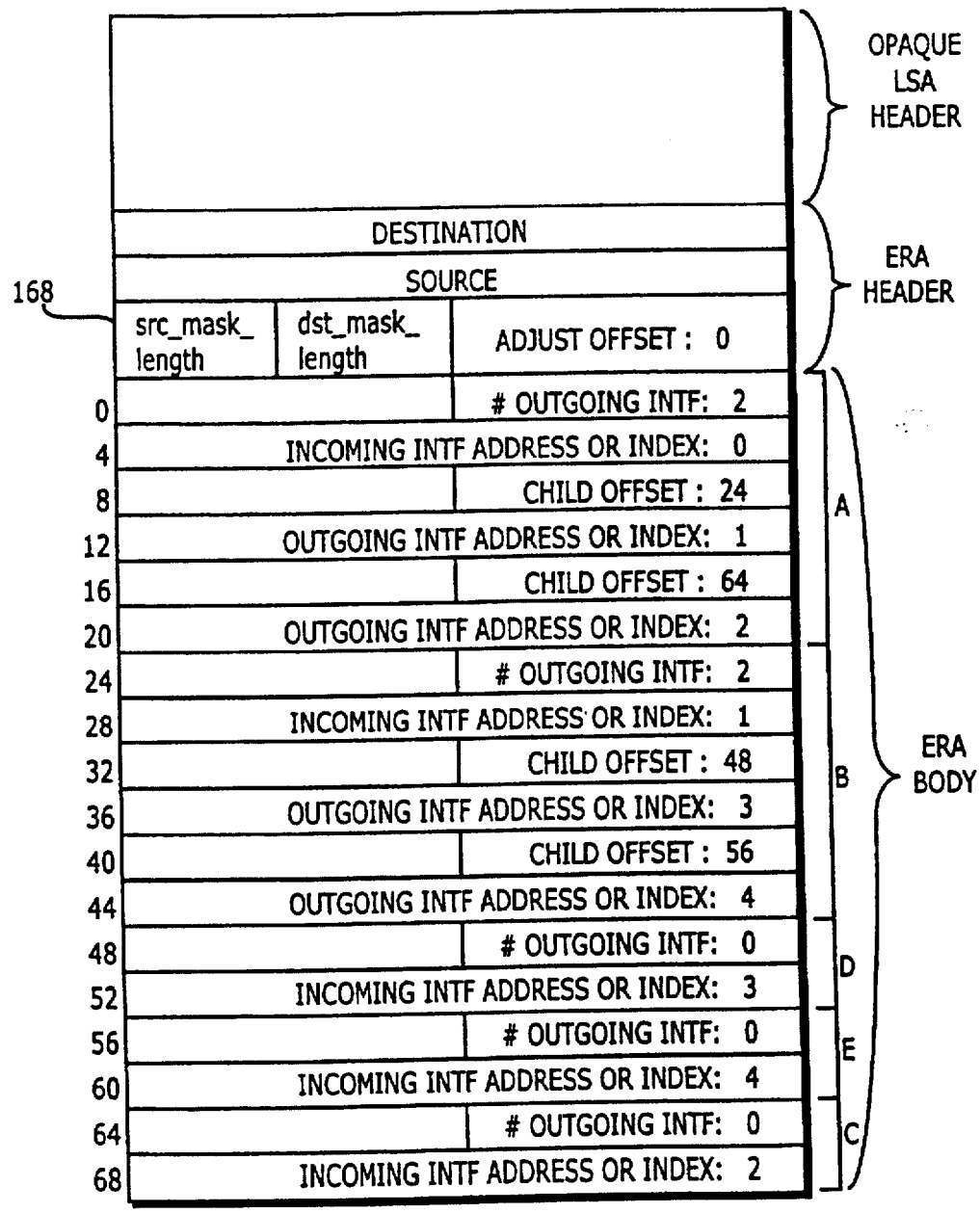
Figure 15:
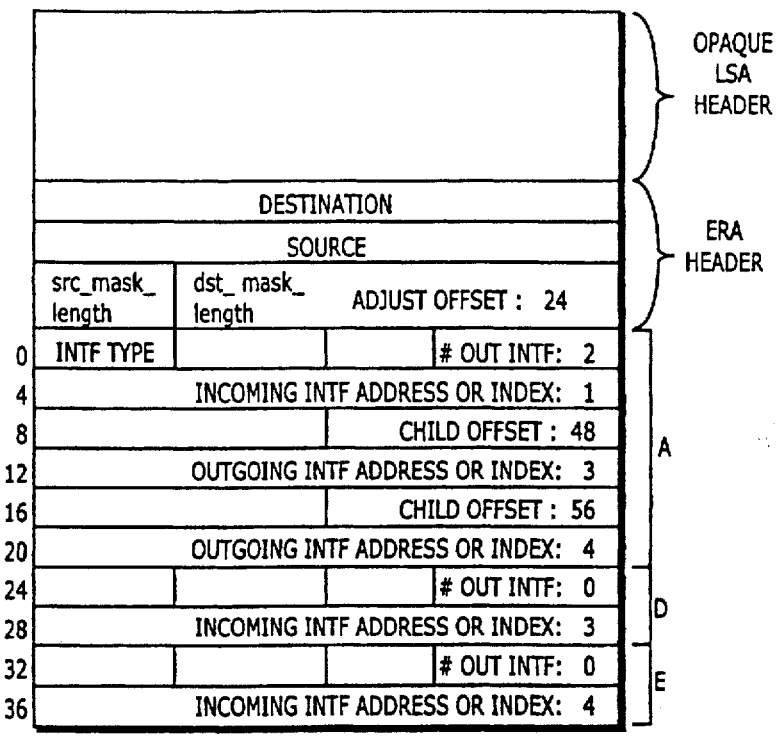
Figure 16:
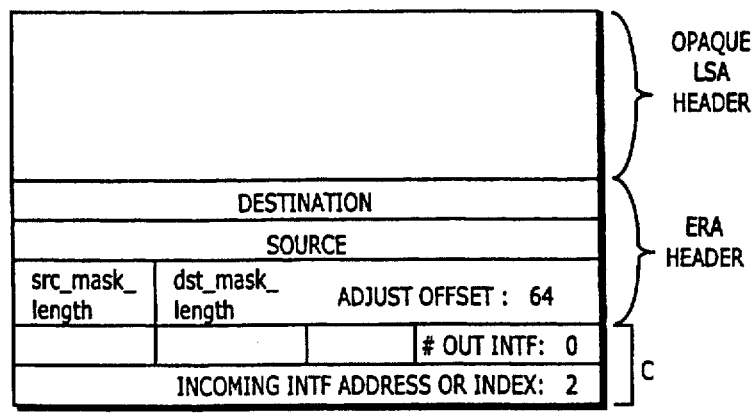
Figure 17:
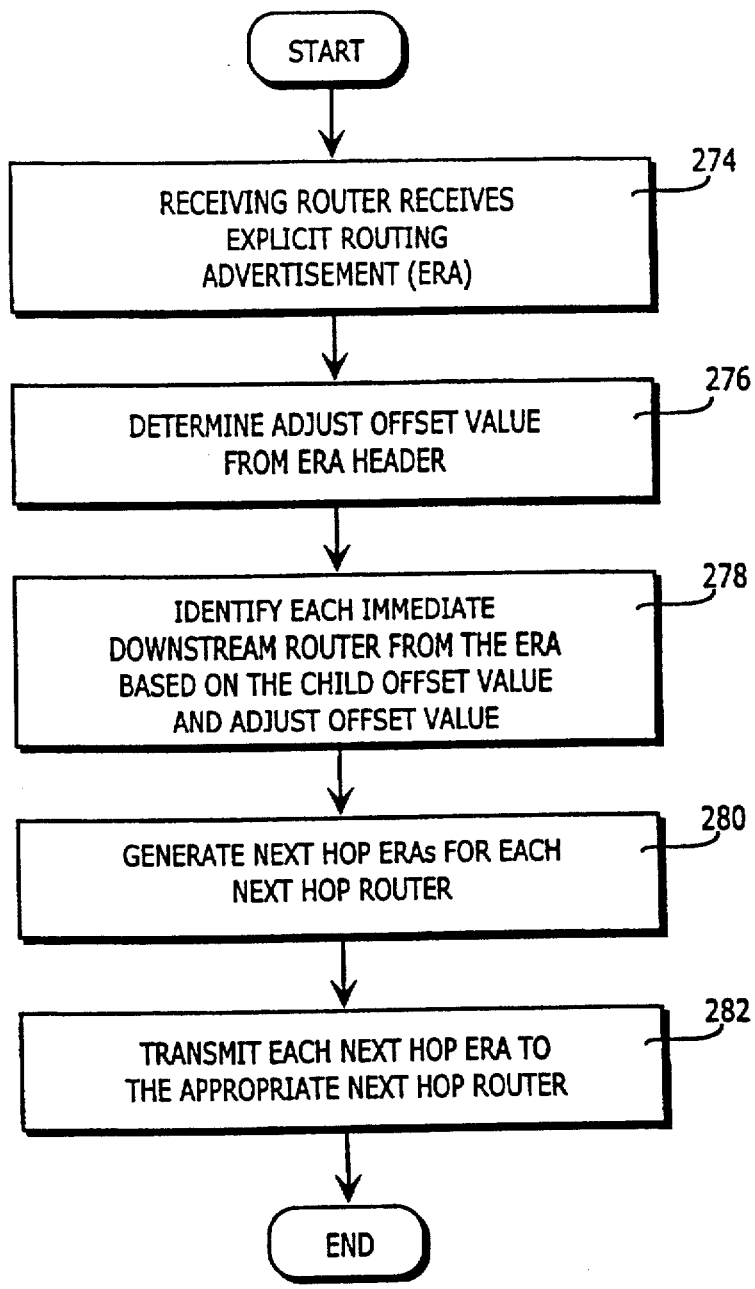
Figure 18:
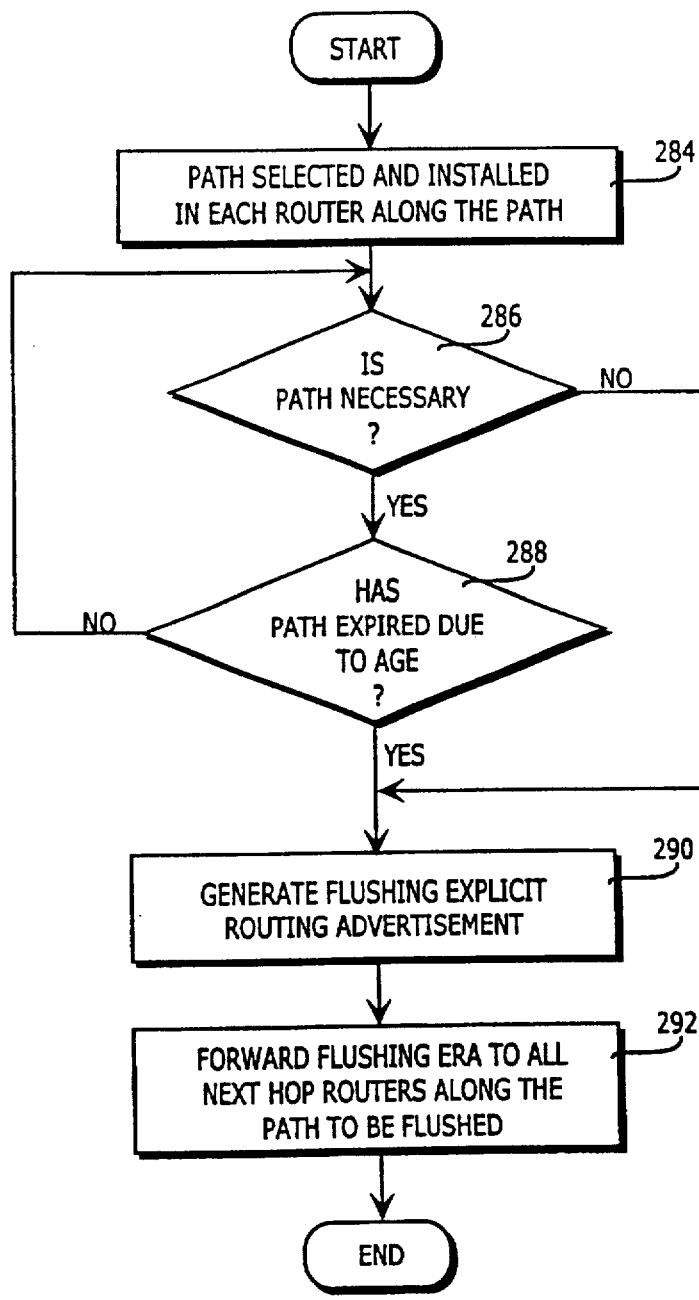

FIG. 8 illustrates a procedure for establishing a QoS path in response to a QoS routing request. At step 170, the host sends QoS requirements. For example, referring to the network shown in FIG. 1, host H1 may request a QoS for a data flow to H4. At step 171, the next router calculates a QoS path based on link resource advertisements and resource reservation advertisements. At step 172, the router forwards the QoS requirements to the next hop router.

Step 174 determines whether the next hop router is the last hop router. If the next hop router is not the last hop router, then the procedure returns to step 171 where the next hop router calculates QoS path based on RES-LSAs and RRAs. If the next hop router is the last hop router, then the procedure continues to step 175 where the receiving host receives the QoS requirements and sends a QoS request to reserve the resources. At step 176, the router receives the QoS request.

At step 178, the router determines whether resources are available for the QoS request. If resources are not available, the procedure branches to step 180 to determine whether the network resources have changed. If network resources have changed, then the procedure returns to step 171 to calculate a new path based on the changed network resources. If network resources have not changed, then the procedure continues from step 180 to step 182 to establish the default path using the standard routing procedures.

If the sending router determines that resources are available for the requested QoS, then step 178 branches to step 184 where the router sends the QoS request to the previous hop router. At step 186, if the previous hop router is not the first hop router, then the procedure returns to step 176. If the previous hop router is determined to be the first hop router at step 186, then the procedure continues to step 188 where the sending host reserves the requested resources.

To summarize the procedure illustrated in FIG. 8, the QoS requirements are propagated from the host to the last hop router by repeating steps 171 through 174. When the last hop router is reached at step 174, the QoS request is propagated from the last hop router back up to the first hop router by repeating steps 176 through 186. If the QoS request propagates back to the first hop router, the QoS requirements are available and the sending host reserves the resources at step 188.

Using the example of FIG. 1, host H1 may send QoS requirements to router R1 requesting a path to host H4. The QoS requirements are propagated through routers R1, R3, and R4 (R4 being the last hop router). Next, the QoS request is propagated from router R4, back through routers R3 and R1 (R1 being the first hop router). If the QoS request propagates back up to router R1, then the QoS requirements are available and host H1 reserves the requested resources.

Calculating paths through the network from a source to a destination is accomplished by running a route computation algorithm such as the Dijkstra algorithm. The Dijkstra algorithm is used to calculate the best, or shortest, path from a particular router to all other routers in the network. Those skilled in the art will be familiar with the implementation of the Dijkstra algorithm and will be familiar with other methods for computing paths in a network.

The Dijkstra algorithm may be modified when used with the QoS routing procedures described herein. Specifically, a router's RES-LSA is used instead of the typical Router-LSA to determine a router's neighboring routers. By using RES-LSAs, a router can ignore a link which does not have sufficient resources for the requested QoS. Thus, only links having sufficient resources will be considered by the Dijkstra algorithm when calculating the best path.

Once a path is selected and the requested resources are reserved, the path may be "pinned down" to prevent the path from changing in response to changes in network topology. Pinning down the path eliminates interruptions in QoS caused by the availability of better links after the path is selected. Once the selected path is pinned, the path is not changed unless a link failure occurs along the path. Therefore, a pinned path may not be the shortest path or the path with the greatest available resources. Path pinning is an optional feature of the QoS routing described above, and may be deactivated, e.g., by the network administrator, to prevent the pinning of paths.

Figure 9:
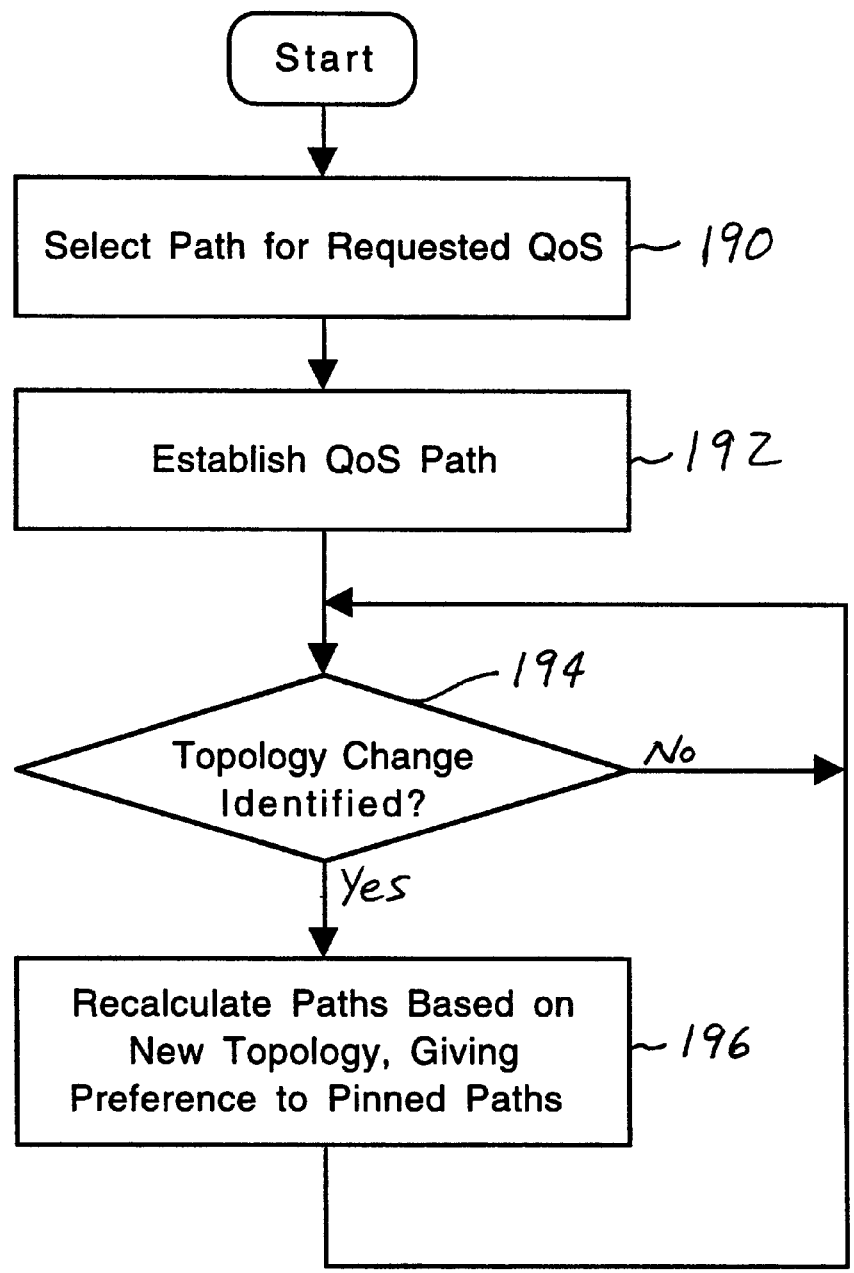
FIG. 9 is a flow diagram illustrating a procedure for selecting, reserving and pinning a path for a requested QoS.

FIG. 9 illustrates a procedure for selecting, establishing, and pinning a path for a requested QoS. Steps 190 and 192 select a path for the requested QoS and establish the path using the procedures discussed above. When the QoS path has been established, step 194 tests for a topology change in the network. If a topology change is not identified, then the procedure returns to step 194 to continuously test for topology changes. If a topology change is detected, then step 196 recalculates paths based on the new topology, giving preference to existing pinned paths. This preference for pinned paths prevents changes to a pinned path unless a link failure occurs along the path.

Path pinning may be controlled using various mechanisms, including a pinning configuration option for each router, a flag (or parameter) in the mechanism requesting the QoS routing, or other administrative controls.

Since the Resource Reservation Advertisements (RRAs) described above include information regarding existing reservations, the algorithm used for pinning paths may be accomplished with a modification to the Dijkstra algorithm discussed above. When the Dijkstra algorithm is run for a particular data flow, the links provided in the RRAs are used in preference to links provided in the Link Resource Advertisements (RES-LSAs). This preserves the original path for the data flow when possible, by preferring previously reserved links. Since reserved links are preferred, a reserved link may be used even though a new and better (e.g., shorter) path is available.

In an embodiment of the invention, two specific changes are made to the Dijkstra algorithm to provide path pinning. First, when adding a vertex to the candidate list, if there is a reservation for the flow on a link that leads to the vertex, then the vertex is marked as "reserved." If a neighbor (W), of a vertex (V) that is just moved to the Shortest Path First (SPF) tree, is already on the candidate list and would not be updated using the standard Dijkstra algorithm, it is still updated if it is not marked as "reserved" and there is a reservation for the flow on the link from V to W.

The second change to the Dijkstra algorithm to provide path pinning involves moving a vertex from the candidate list to the SPF tree. Among all vertices marked as "reserved", the "reserved" vertex having the smallest delay is selected. The "reserved" vertex is selected even if an unreserved vertex has a smaller delay. Unreserved vertices are moved to the SPF tree only when there are no "reserved" vertices in the candidate list.

As discussed above, an entire path may be "pinned." In a particular embodiment of the invention, a portion of a path may be "pinned." This "partial pinning" may be implemented, for example, when a router or host transmits a message through a QoS reservation mechanism to the previous hop router indicating a desire to have the path between itself and the source pinned. Routers along the path make the requested reservations and notify the routing protocol that the path should be pinned. When a router transmits a Resource Reservation Advertisement (RRA) for the data flow, a "pin flag" may be set in the RRA for the link to be pinned. When the route is recalculated, instead of preferring all links with reservations, only those links with "pinned" reservations are preferred. Therefore, only a portion of the path is pinned, rather than the entire path.

As discussed above, explicit routing may be used to reduce the amount of data generated and transmitted across the network. When using explicit routing, the first hop router calculates the entire path through the network and provides forwarding instructs to each downstream router regarding the data flow.

Figure 10:
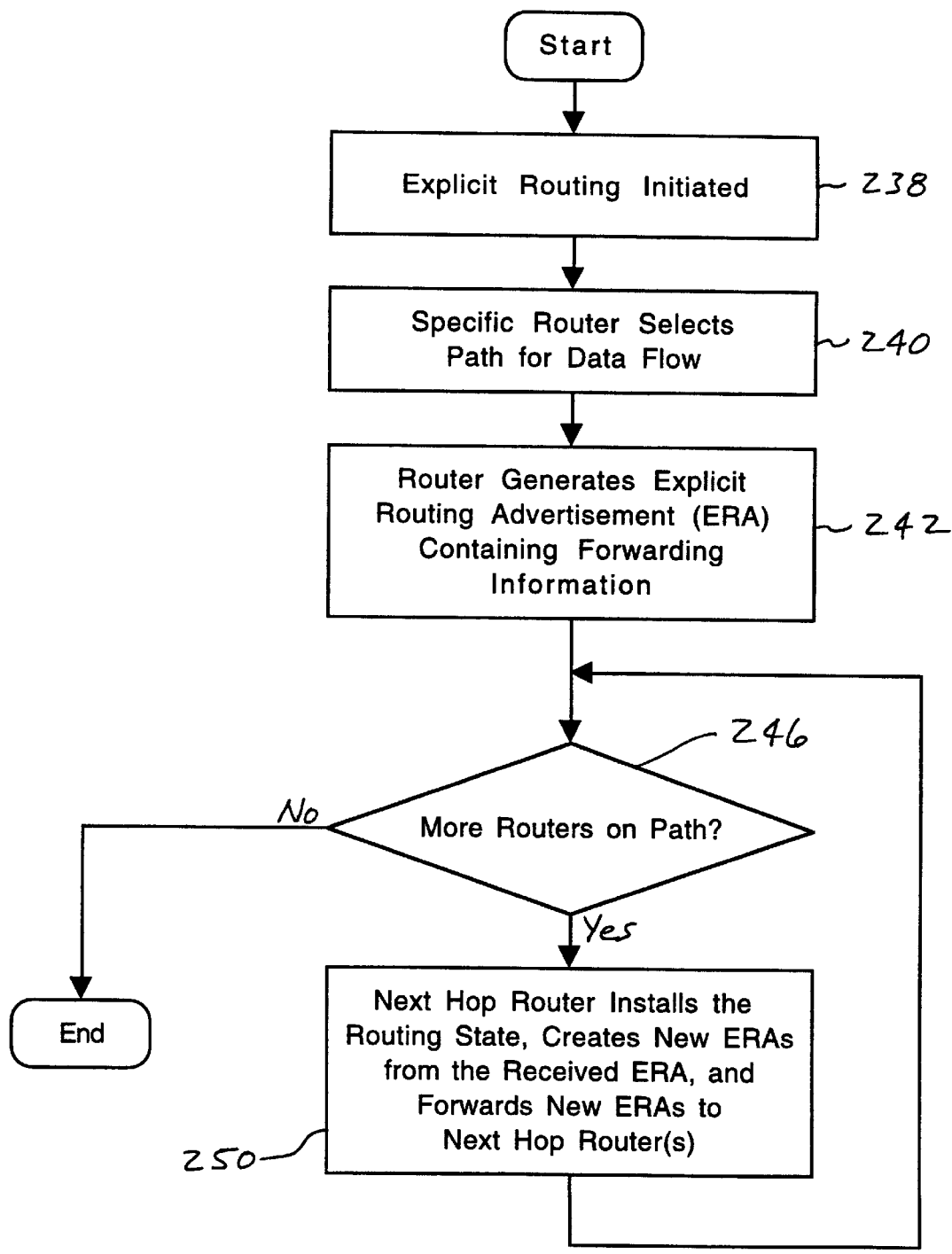
FIG. 10 is a flow diagram illustrating a procedure for performing explicit routing.

Referring to FIG. 10, a flow diagram illustrates a procedure for explicit routing. A triggering event initiates the explicit routing procedure at step 238. Triggering events may include a host transmitting data to a particular destination, a request for a particular quality of service, or a specific traffic flow exceeding a traffic threshold set for the path.

At step 240 of FIG. 10, a specific router, such as the router receiving the initiating event, selects a path for the data flow (a path to the destination). The router calculates a path through the network by running a route computation algorithm such as the Dijkstra algorithm. For example, referring to FIG. 1, the explicit routing procedure may be initiated by host 110 transmitting data to host 116, thereby causing router 100 to select a path to the destination.

At step 242 of FIG. 10, the router generates an Explicit Routing Advertisement (ERA) containing forwarding information. Additional details regarding the information contained in the ERA is provided below. In the example of FIG. 1, the ERA generated by router 100 contains forwarding information for router 104 and router 106. This forwarding information instructs router 104 and router 106 regarding forwarding of the data flow. Since the forwarding information is explicitly provided in the ERA, routers 104 and 106 do not need to perform the Dijkstra calculations.

In step 246, if more routers are on the path to the destination, then the procedure continues to step 250 where the next hop router installs the routing state from the ERA, creates (or generates) new ERAs from the received ERA, and forwards the new ERAs to the next hop routers. Additional details regarding the creation of new ERAs will be described below. From step 250, the procedure returns to step 246 to check for additional routers on the path. If no additional routers are identified along the path in step 246, then the explicit route state has been installed to all routers along the path and the data is allowed to flow across the path. The explicit routing procedure illustrated in FIG. 10 is transparent to the host.

In the example of FIG. 1, router 104 receives the ERA from router 100 and installs its routing state based on information contained in the ERA. Router 104 generates a new ERA from the received ERA and forwards the ERA to the next hop router (router 106). Since router 106 is the destination router (to host 116), the selected path is established and data may be transmitted over the selected path via routers 100, 104, and 106.

A specific example of the explicit routing procedure will be described with reference to the Open Shortest Path First (OSPF) routing protocol (and multicast extensions, MOSPF). As discussed above, OSPF uses Link State Advertisements (LSAs) to broadcast information regarding various routers and links in the network. A specific type of LSA which may be supported by OSPF is the Opaque LSA. The Opaque LSA provides a general mechanism to permit extensions of the OSPF protocol.

Two different types of ERAs may be used with explicit routing, an Installation ERA and a Flushing ERA. The Installation ERA is used to distribute forwarding information to other routers in the network. The Flushing ERA is used to remove obsolete forwarding information from the routers. The Flushing ERA may be used when a route changes, thereby removing the route information contained in a previous Installation ERA.

Figure 11:
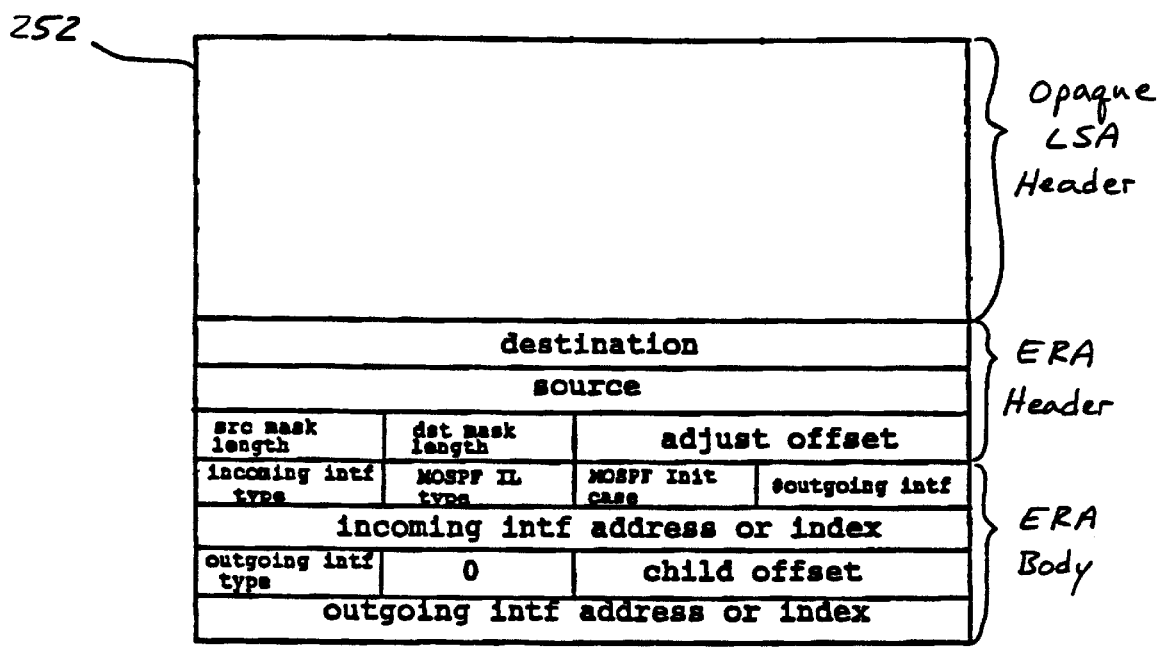
FIG. 11 illustrates an example format for an Installation Explicit Routing Advertisement.

FIG. 11 illustrates an exemplary format for an Installation ERA 252. ERA 252 is illustrated as encapsulated in an Opaque LSA and includes three different portions. The top portion of ERA 252 is a standard Opaque LSA header. The middle portion is the ERA header, and the bottom portion is the body of the ERA. The ERA header contains information that identifies a particular data flow and information regarding ERA Offset adjustment. The src mask length and dst mask length correpsond to the network mask length for the source and destination, respectively. Each ERA describes route on a distribution tree. The ERA body contains information about incoming and outgoing interfaces for each router along the path. The interface types are the same as those used in OSPF Router LSAs. The adjust offset and child offset fields are used to encode the distribution tree into the ERA body, as described below. The remaining fields illustrated in FIG. 11 contain parameters and information commonly used in the OSPF and MOSPF routing protocols.

When the selected router has finished calculating a particular route, the router creates an ERA containing the calculated distribution tree that has the router as the root of the tree. The distribution tree is encoded into the ERA for use by other routers along the path.

Figure 12:
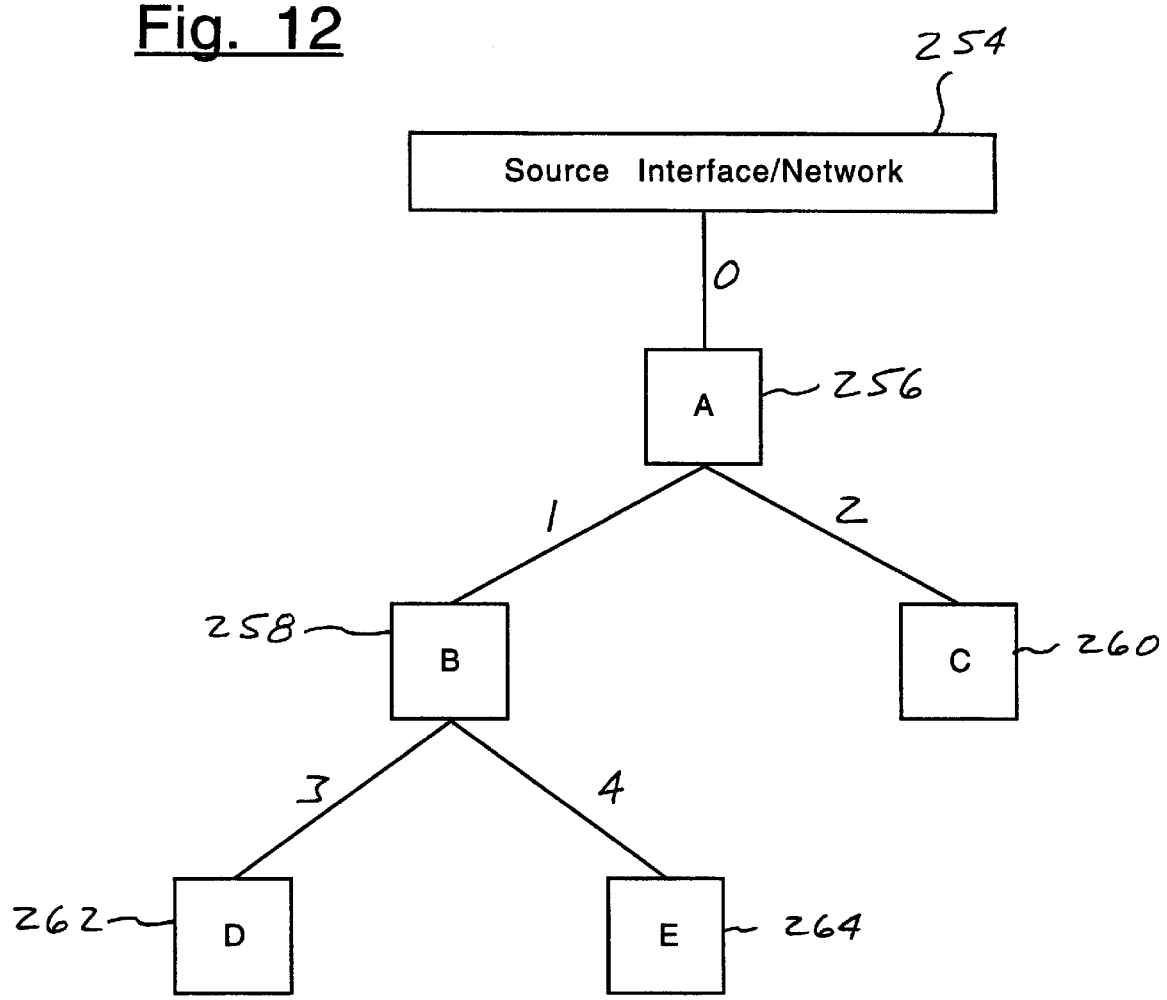
FIG. 12 illustrates an example of a route tree calculated by a specific router.

FIG. 12 illustrates an example of a multicast distribution tree calculated by a selected router. A source interface or network 254 is coupled between a host (not shown) and a router 256 (also referred to as router A). The distribution tree also includes downstream routers 258, 260, 262, and 264 (also referred to as routers B, C, D, and E, respectively). The numbers associated with each link are the interface addresses or indices. When encoding the distribution tree shown in FIG. 12 into an ERA, the ERA is constructed by traversing the tree in "preorder." Preorder traversing follows the left side of the tree until it terminates, then moves back up the tree, following each branch to the right. Thus, an ERA for the tree shown in FIG. 12 lists routers in the following order: A, B, D, E, C. In a unicast situation, the distribution tree consists of a single branch.

The example provided with respect to FIG. 12 describes a first hop router performing the path calculations and generating the initial ERA. However, any router along a path may perform the path calculations and forward the ERAs to other routers along the path. The use of a first hop router to calculate the path, as described with respect to FIG. 12, is one example of explicit routing.

Figure 13:
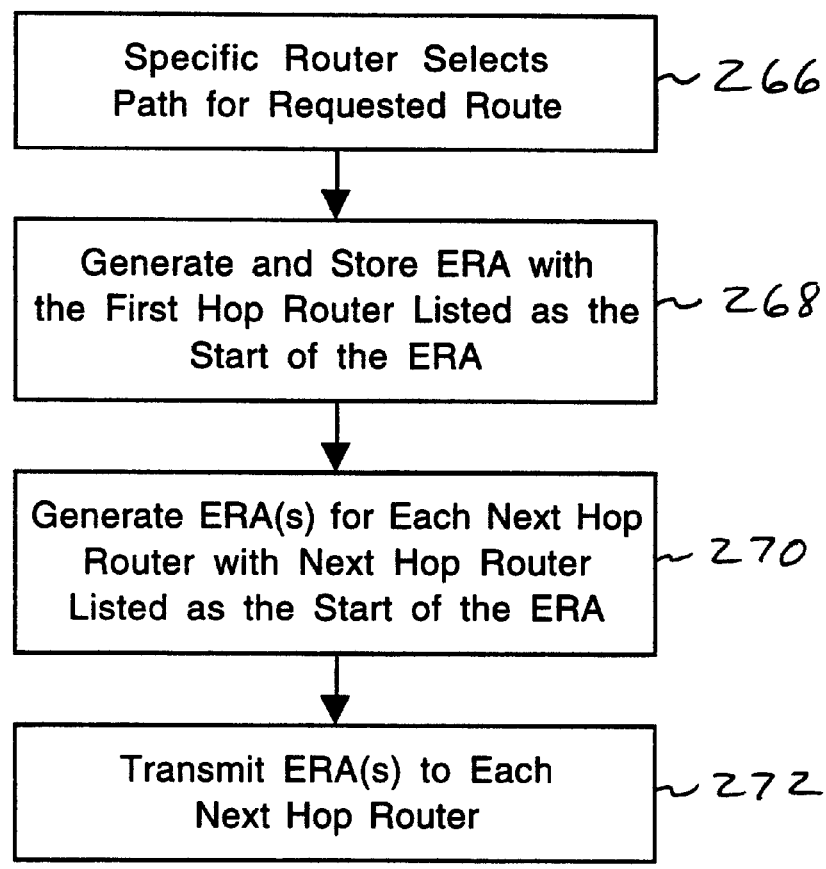
FIG. 13 is a flow diagram illustrating the procedure used to generate and transmit Explicit Routing Advertisements to the next hop routers.

Referring to FIG. 13, a flow diagram illustrates the procedure used to generate and transmit ERAs to the next hop routers. At step 266, a specific router selects a path for the data flow. Step 268 generates and stores an ERA with the first hop router listed as the beginning of the ERA. An example of this "complete" ERA is discussed below with reference to FIG. 14. At step 270, the router generates a separate ERA for each next hop router, with the next hop router listed at the beginning of the ERA. Examples of the ERAs generated at step 270 are discussed below with reference to FIGS. 15 and 16. Once generated, the ERA for each next hop router is transmitted to the appropriate next hop router at step 272.

The procedure of FIG. 13 will be described with reference to FIG. 12. Router A first selects a path through the network for the requested route. When a path has been selected, router A generates and stores an ERA with router A listed at the beginning of the ERA. The router stores this full ERA to enable flushing. Router A also generates an ERA for each next hop router (routers B and C). The ERA for router B has router B at the beginning of the ERA and the ERA for router C has router C at the beginning of the ERA.

Figure 14:
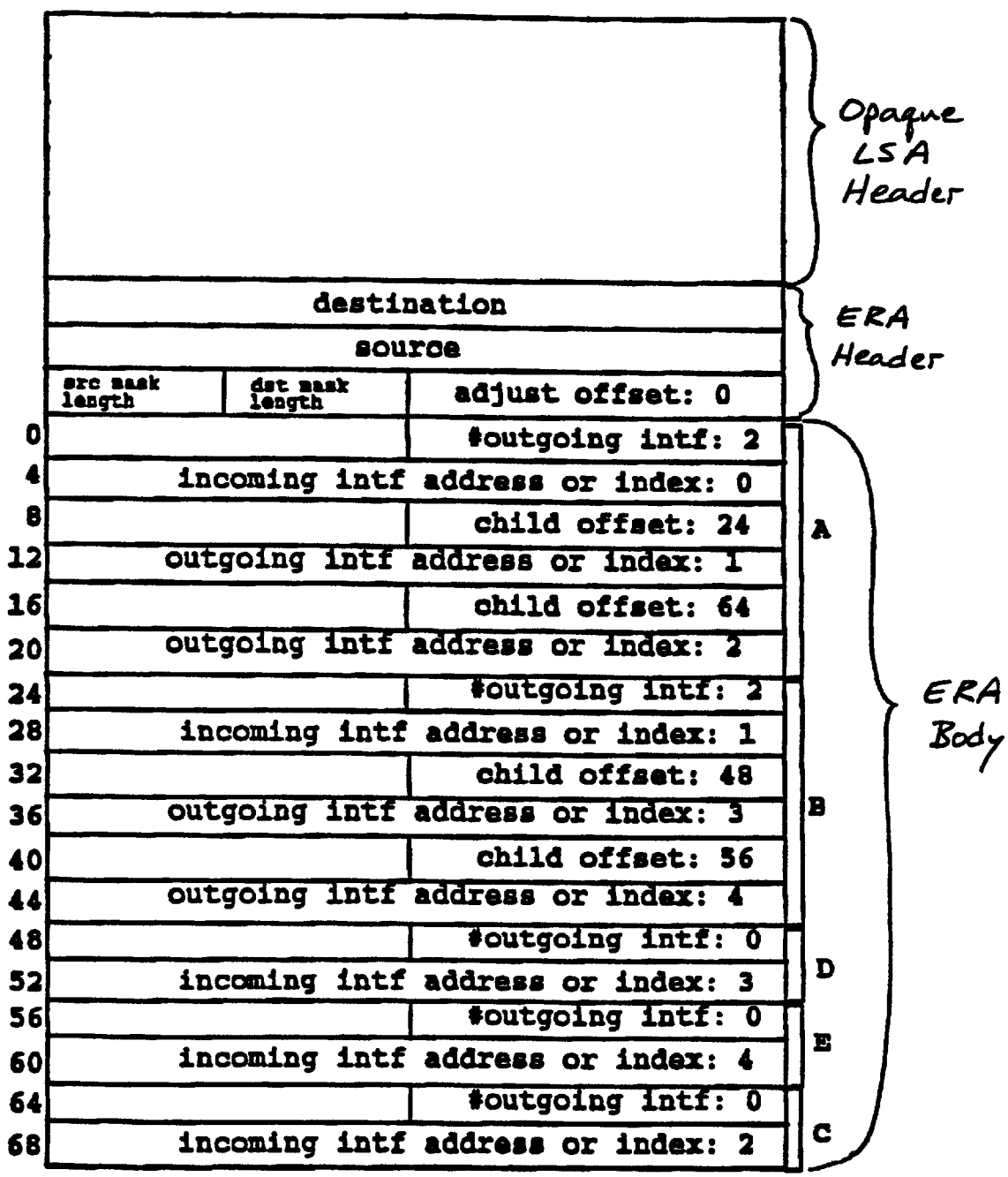
FIGS. 14–16 illustrate various examples of Explicit Routing Advertisements.

FIG. 14 illustrates an exemplary format for the "complete" ERA generated and stored by router A (FIG. 12). The offset values instruct the next router where to begin looking at tree information in the ERA. Therefore, the offsets allow each router along the path to see only its relevant (e.g., downstream) portion of the tree. By encoding the distribution tree and using offsets, routers on the path are not required to reparse the entire ERA.

Figure 17:
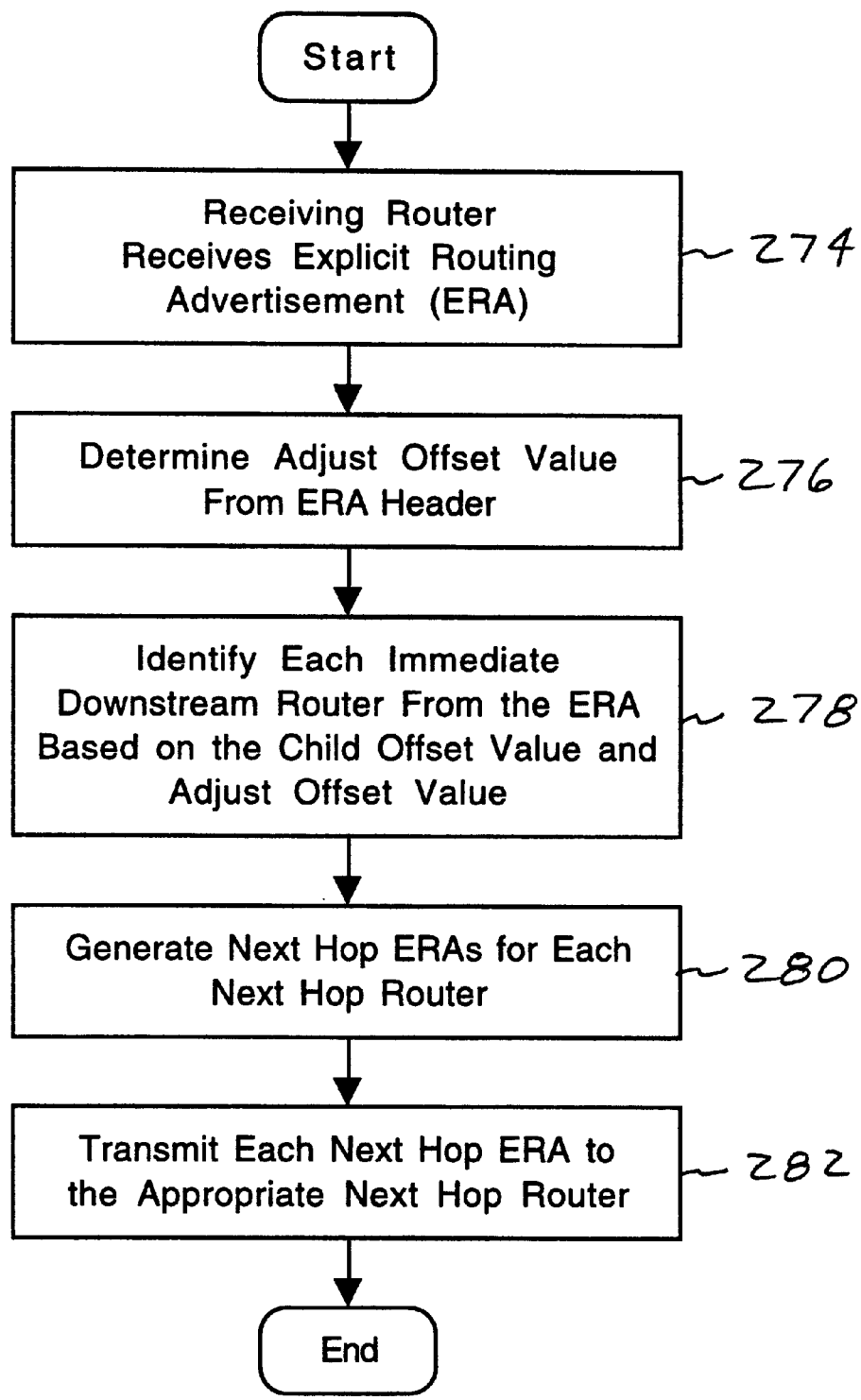
FIG. 17 illustrates a procedure for processing an Installation Explicit Routing Advertisement.

FIG. 17 illustrates a procedure for processing an Installation Explicit Routing Advertisement. At step 274, the receiving router receives the ERA. In the case of the source, or highest level, router the router itself may generate the "complete" ERA. Step 276 determines the adjust offset value from the ERA header. The adjust offset and child offset values are used to determine the location of children (next hop routers) within the body of the ERA. At step 278, each immediate downstream router is identified from the ERA body based on its child offset value and adjust offset value. Step 280 generates an ERA for each next hop router by setting the adjust offset value in the next hop ERA to the child offset value in the received ERA. The data for the next hop tree is copied into the new ERA. Step 282 transmits each next hop ERA to the appropriate next hop router.

FIG. 17 describes the "generation" of "new" ERAs for each next hop routers. As described above and illustrated in the following example, the "new" ERA is "generated" by changing an adjust offset value within the ERA header. This offset value instructs each next hop router where to locate its relevant information in the ERA body. Thus, the next hop ERAs contain the same child offset information as the received ERA, with a modification of the offset value. Therefore, the next hop routers do not recalculate the path, but rather modify the offset value to "point" to different portions of the tree encoded in the ERA.

The procedure described in FIG. 17 will be illustrated using the example tree illustrated in FIG. 12. The "complete" ERA generated by router A is shown in FIG. 14. Since this is the initial ERA, the adjust offset field in the ERA header is set to zero, indicating no offset. The receiving router (router A in this example) is listed first in the ERA body. The first field in the body indicates that router A has two outgoing interfaces. These two outgoing interfaces are identified later in the ERA as having addresses 1 and 2. The incoming interface address is 0. The first child offset field (set to 24) indicates where within the ERA body information regarding that child (next hop router) can be found. As shown in FIG. 7, byte 24 is the beginning of the information regarding router B (the child on outgoing interface 1). Similarly, the data for router A indicates the offset to router B (on interface 2) is 64.

Router B also has two outgoing interfaces (addresses 3 and 4) as indicated at bytes 36 and 44. The incoming interface for router B (address 1) is identified at byte 28. The child offsets for B's next hop routers are set to 48 (router D) and 56 (router E).

Regarding the ERA data for routers D, E and C, each router has a similar number outgoing interfaces (zero) because there are no next hop routers. Therefore, no child offset is provided because there are no children of routers D, E or C.

Figure 15:
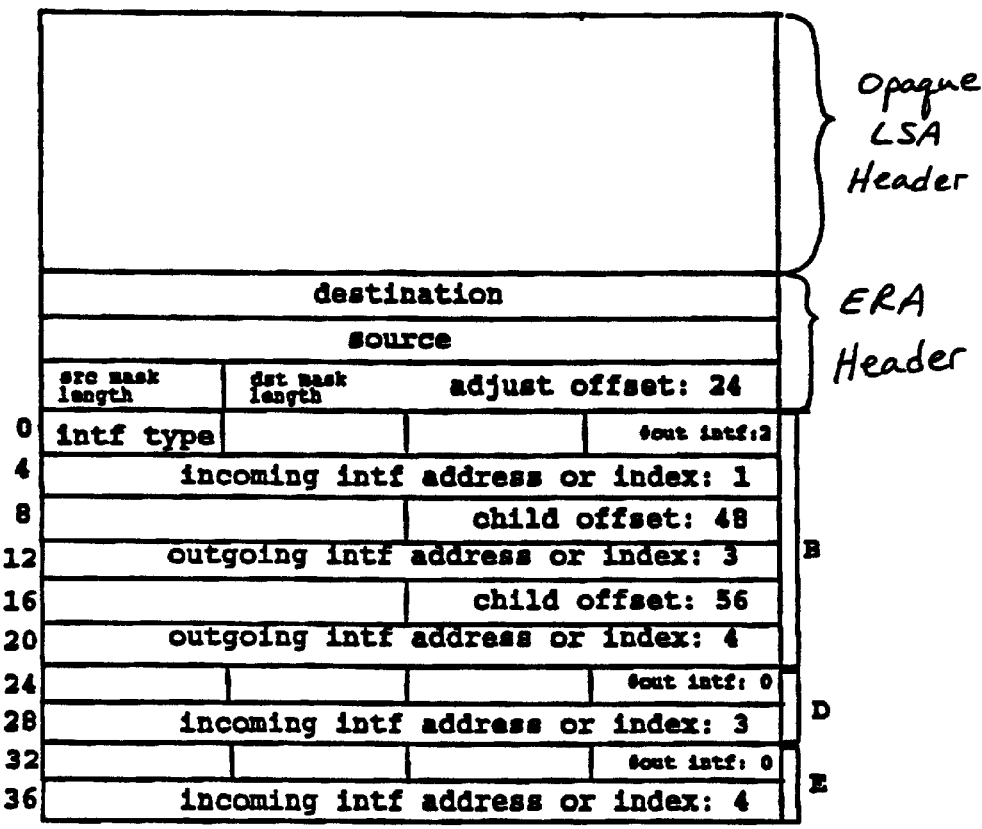

Router A generates an ERA for each next hop router (router B and router C). FIG. 15 illustrates the ERA generated and transmitted to router B. The adjust offset in the ERA header is set to the child offset for the router in the "complete" ERA. In this case, B's child offset is set to 24, meaning that 24 is subtracted from each offset value in the ERA transmitted to router B. Two child offsets are listed for router B (48 and 56). To find the data relating to B's children, the adjust offset value of 24 is subtracted from each child offset (providing actual values of 24 and 32). As shown in FIG. 15, the data for router D begins at byte 24 and the data for router E begins at byte 32.

Figure 16:
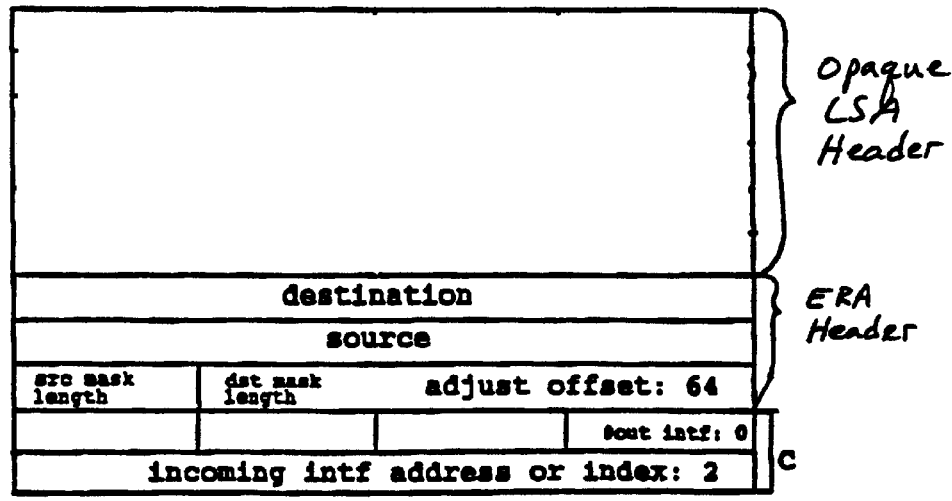

FIG. 16 illustrates the ERA generated by router A and transmitted to router C. Since router C has no children, the ERA body only contains data relating to router C.

As illustrated by the above example, each router changes the adjust offset value in the ERA headers for its next hop routers to identify the relevant portions of the distribution tree. The routers do not recalculate the path, but instead, obtain all forwarding information from the body of the ERA.

Figure 18:
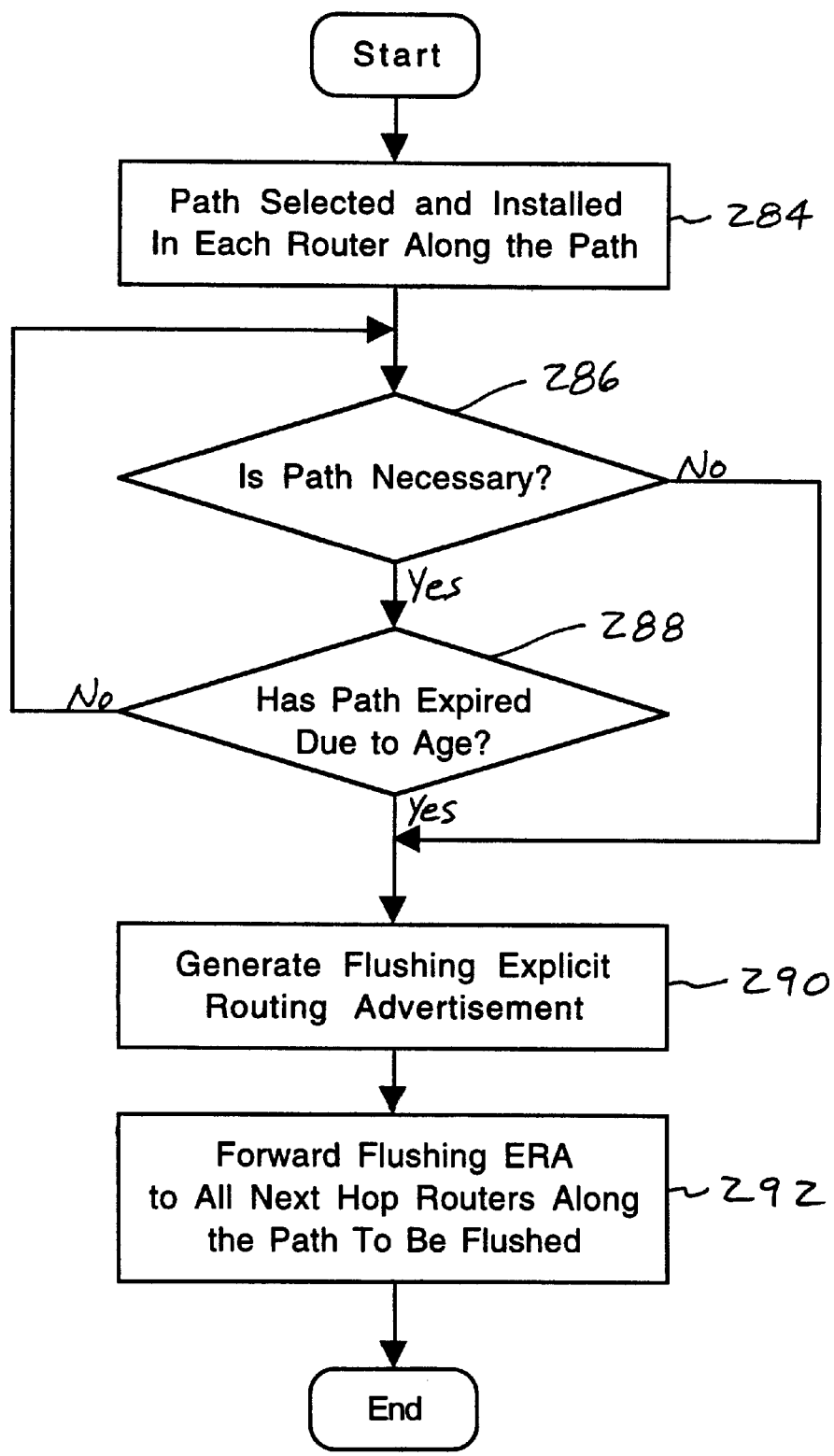
FIG. 18 illustrates a procedure for flushing installed routing states.
Figure 1:
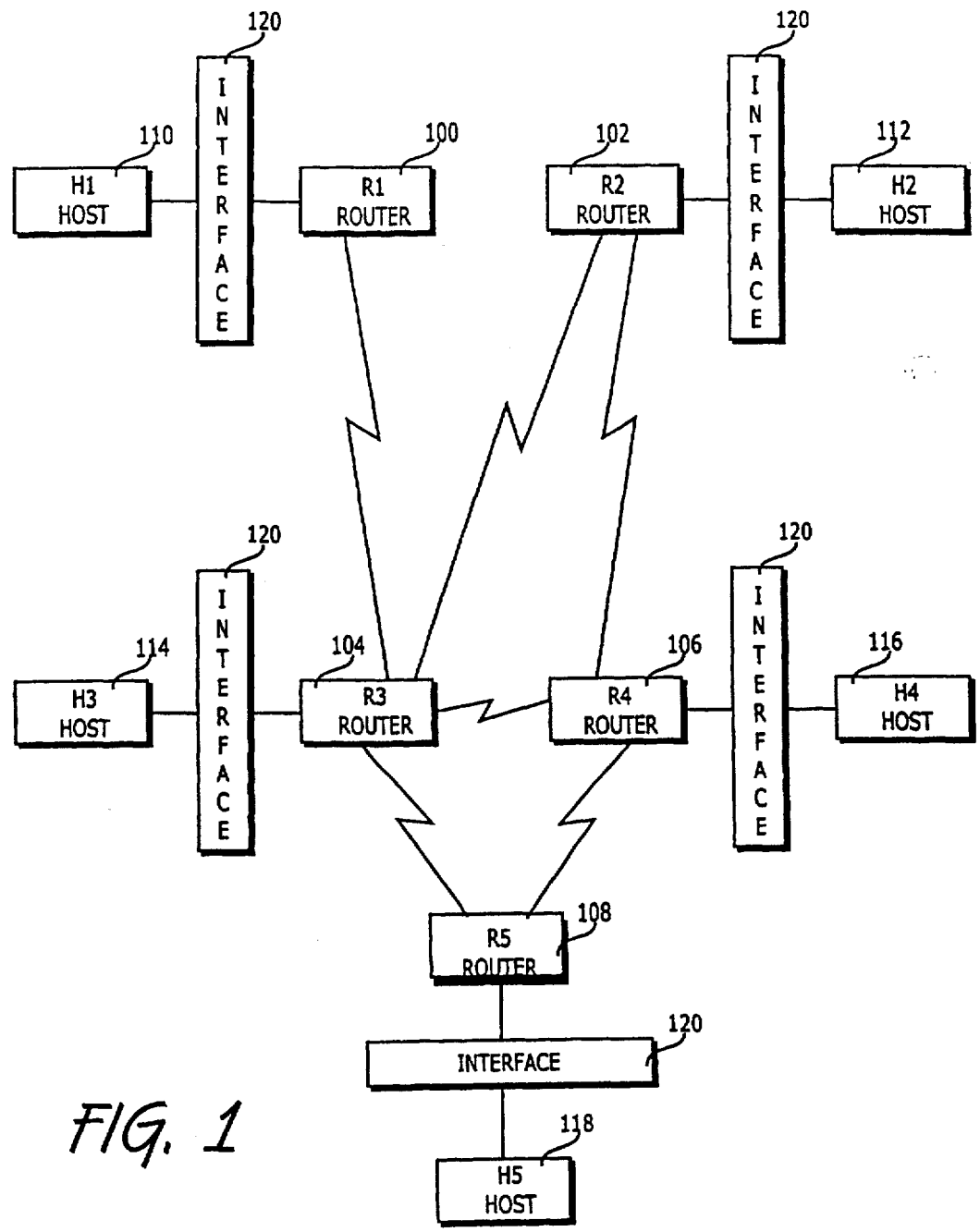
Figure 2:
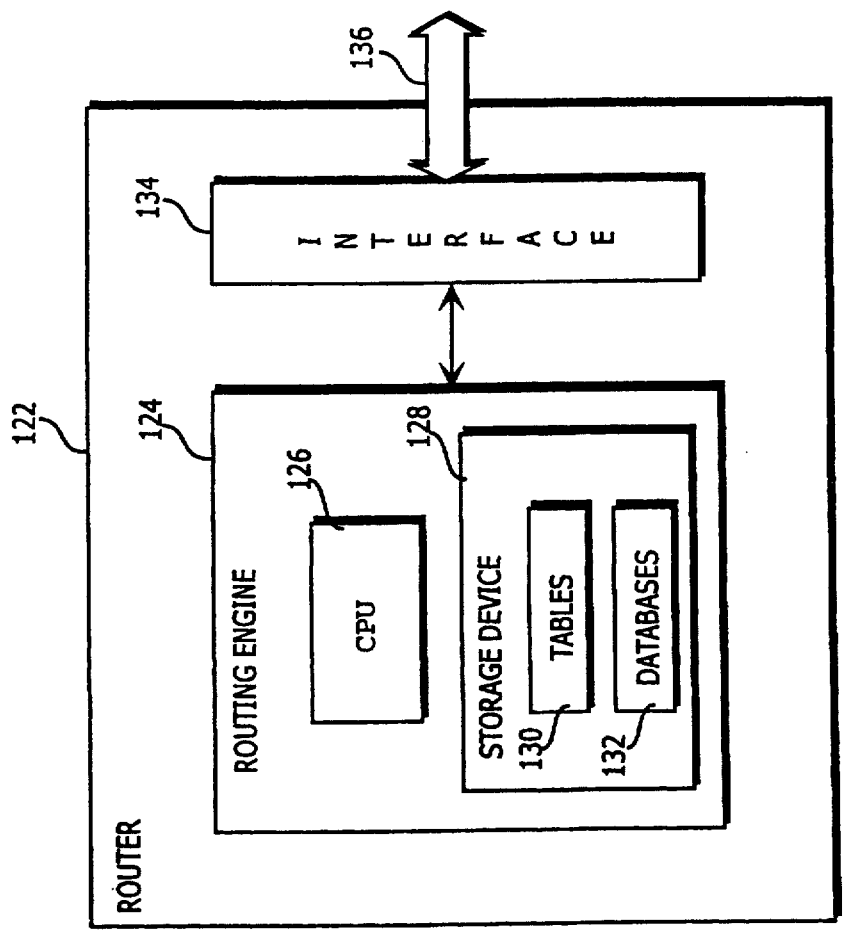
Figure 3:
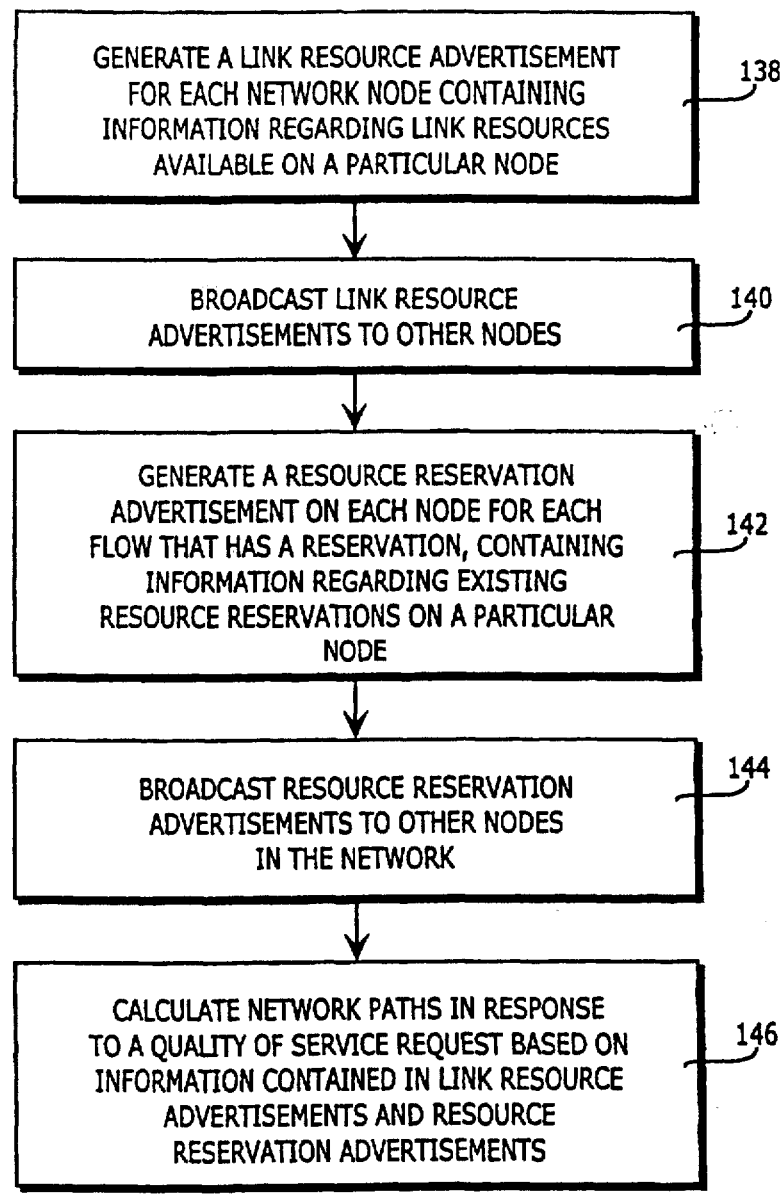
Figure 4:
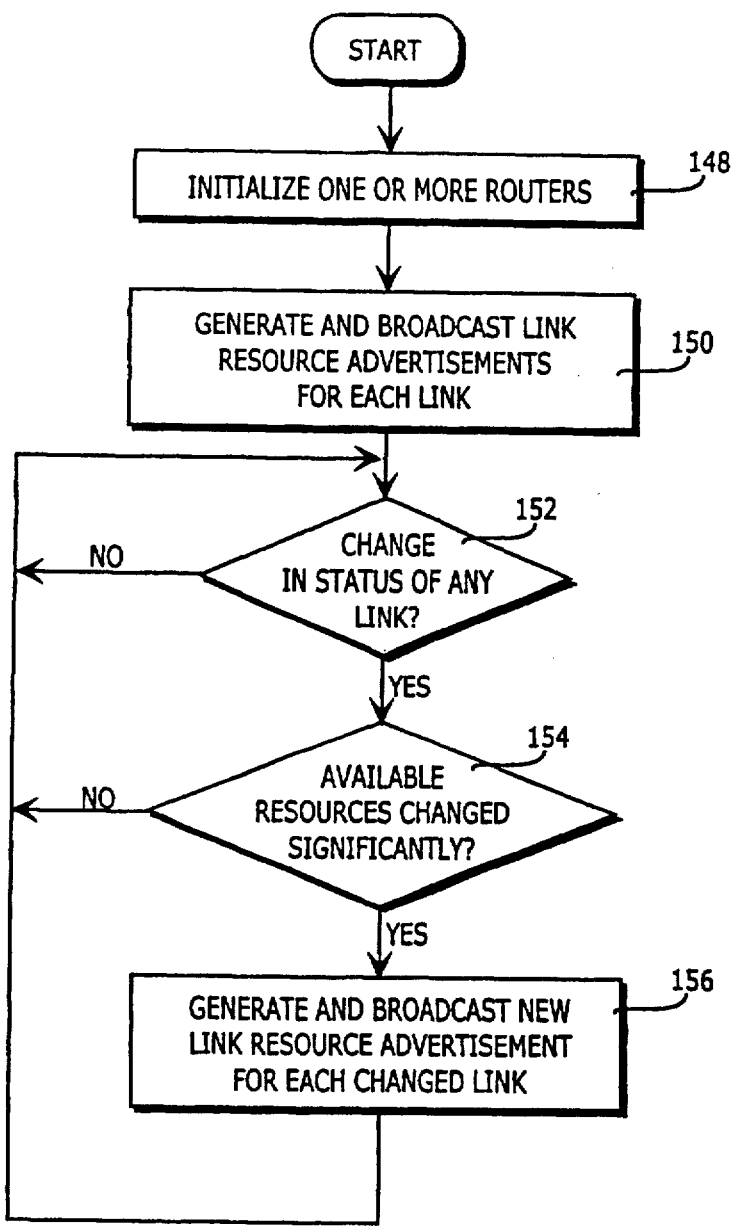

FIG. 18 illustrates a procedure for flushing installed routing states. At step 284, a path is selected and installed in each router along the path using the procedures described above. Step 286 determines whether the path is necessary (for example, whether an existing data flow is using the path). If the path is necessary, step 288 determines whether the path has expired due to age. If the age of a path is not updated for a particular time period, the path will expire. If the path has not expired at step 288, then the procedure returns to step 286 to determine whether the path remains necessary.

If the path is not necessary (step 286) or the path has expired (step 288), then step 290 generates a flushing explicit routing advertisement (Flushing ERA). Step 292 forwards the Flushing ERA to all next hop routers along the path to be flushed. Flushing unnecessary or expired paths provides additional resources within the routers along the path.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for providing quality of service routing functions in a connectionless network having a plurality of nodes, said method comprising the steps of:

generating a link resource advertisement for each node in said network, each link resource advertisement including information regarding link resources available on a particular node in said network;

generating resource reservation advertisements for each node in said network, each resource reservation advertisement including information regarding a particular node's reservations; and calculating network paths in response to a quality of service request, said calculation based on said link resource advertisements and said resource reservation advertisements.

2. The method of claim 1 wherein said link resource advertisement includes a delay factor associated with each link coupled to the node.

3. The method of claim 1 wherein said link resource advertisement includes the largest amount of available resources for each of the node's links.

4. The method of claim 1 wherein said link resource advertisement includes the available bandwidth on each link coupled to the node.

5. The method of claim 1 further including the step of supporting a path between a source and a destination, said path providing the requested quality of service.

6. The method of claim 5 wherein said path established between said source and said destination is pinned such that the path does not change in response to changes in available link resources.

7. The method of claim 5 wherein said path established between said source and said destination is pinned such that the path does not change in response to changes in network topology not affecting the pinned path.

8. The method of claim 1 wherein said network path is calculated based upon information contained in said link resource advertisements.

9. The method of claim 1 wherein said network path is calculated by considering only links and nodes having sufficient available resources.

10. The method of claim 1 wherein said link resource advertisement is a modified link state advertisement as used in the open shortest path first (OSPF) routing protocol.

11. A method for providing quality of service (QoS) routing functions in a network using the open shortest path first (OSPF) routing protocol, said method comprising the steps of:

generating a link resource advertisement for each router in said network, each link resource advertisement including information regarding link resources available on a particular router in said network;

generating resource reservation advertisements for each router in said network, each resource reservation advertisement including information regarding a particular router's reservations; and selecting a path for a requested QoS in based on information contained in said link resource advertisement and said resource reservation advertisement.

12. The method of claim 11 wherein said link resource advertisement includes a delay factor associated with each link coupled to the router.

13. The method of claim 11 wherein said link resource advertisement includes the available bandwidth on each link coupled to the router.

14. The method of claim 11 wherein said selected path is pinned such that the path does not change in response to changes in available link resources.

15. The method of claim 11 wherein said selected path is pinned such that the path does not change in response to changes in network topology not affecting the pinned path.

16. A method for providing quality of service (QoS) routing functions in a connectionless network having a plurality of nodes, said method comprising the steps of:

advertising network resources to said nodes in said network;

selecting a path through said network satisfying a requested QoS routing based on said advertised network sources, said advertised network sources comprising information regarding link resources of a particular node in said network and information regarding a particular node's reservation in said network;

reserving network resources along said selected path; and pinning said selected path such that the path does not change in response to changes in network resources.

17. The method of claim 16 wherein said path through said network is selected by considering network links having sufficient available resources for the required QoS.

18. The method of claim 16 wherein the step of advertising network resources further includes advertising a link resource advertisement including information regarding link resources available on a particular node in said network.

19. The method of claim 16 wherein the step of advertising network resources further includes advertising a resource reservation advertisement including information regarding a particular node's reservations.

20. A method for establishing a quality of service (QoS) routing through a connectionless network having a plurality of nodes, said method comprising the steps of:

requesting a particular QoS routing through said network;

determining resources available on each node in said network;

determining resources currently reserved on each node in said network;

selecting a path having sufficient resources to satisfy said QoS routing requirements the path selection based upon information regarding link resources available on a particular node in said network and information regarding a particular node's reservations in said network; and reserving resources along said selected path.

21. The method of claim 20 wherein the step of selecting a path includes considering only network links having sufficient available resources for the required QoS.

22. The method of claim 20 wherein said selected path is pinned such that the path does not change in response to changes in available resources.

* * * * *

UNITED STATES PATENT AND TRADEMARK OFFICE
CERTIFICATE OF CORRECTION

PATENT NO. : 5,995,503
DATED : November 30, 1999
INVENTOR(S) : Crawley et al.

It is certified that error appears in the above-identified patent and that said Letters Patent is hereby corrected as shown below:

Please replace figures 1-18 with the enclosed formal drawings 1-18.

<u>Column 14,</u>
Line 52, delete "routing requirements the path selection" and insert
-- routing requirements, the path selection --.

Signed and Sealed this

Third Day of July, 2001

*Attest:*

*Attesting Officer*

NICHOLAS P. GODICI
*Acting Director of the United States Patent and Trademark Office*